US012762887B2

(12) United States Patent
Derckx et al.

(10) Patent No.: US 12,762,887 B2
(45) Date of Patent: Oct. 13, 2026

(54) APPARATUS AND METHOD

(71) Applicant: Touch Biometrix B.V., Weert (NL)

(72) Inventors: Henricus Derckx, Weert (NL); Michael Cowin, Weert (NL); Wilhelmus Van Lier, Weert (NL); Toru Sakai, Weert (NL)

(73) Assignee: Touch Biometrix B.V., Weert (NL)

( * ) Notice: Subject to any disclaimer, the term of this patent is extended or adjusted under 35 U.S.C. 154(b) by 0 days.

(21) Appl. No.: 18/708,799

(22) PCT Filed: Nov. 14, 2022

(86) PCT No.: PCT/GB2022/052885
§ 371 (c)(1),
(2) Date: May 9, 2024

(87) PCT Pub. No.: WO2023/084245
PCT Pub. Date: May 19, 2023

(65) Prior Publication Data

US 2025/0022306 A1 Jan. 16, 2025

(30) Foreign Application Priority Data

Nov. 12, 2021 (GB) ..................................... 2116348
Nov. 12, 2021 (GB) ..................................... 2116352

(51) Int. Cl.
*G06V 40/13* (2022.01)

(52) U.S. Cl.
CPC ................................ *G06V 40/1306* (2022.01)

(58) Field of Classification Search
None
See application file for complete search history.

(56) References Cited

U.S. PATENT DOCUMENTS

2015/0331508 A1 11/2015 Nho et al.
2016/0098140 A1* 4/2016 Lee ....................... G06F 3/0443 345/173

(Continued)

FOREIGN PATENT DOCUMENTS

| | | |
|---|---|---|
| KR | 1020160033328 | 3/2016 |
| WO | 99/28701 | 6/1999 |
| WO | 2020/079838 | 4/2020 |

OTHER PUBLICATIONS

Examination Report issued in GB2116348.0 (Apr. 11, 2022).

(Continued)

*Primary Examiner* — Joseph R Haley
(74) *Attorney, Agent, or Firm* — Barnes & Thornburg

(57) ABSTRACT

An aspect of the disclosure provides a cover glass configured to overlie a display screen of a user equipment, UE, device, the cover glass comprising: a substrate arranged to overlie a said display screen for protecting said display screen, wherein the substrate has a display-facing surface and a user-facing surface; and a capacitive biometric skin contact sensor coupled to the substrate and configured to resolve the contours of skin proximal to the sensor, the sensor comprising: a plurality of gate drive channels; a plurality of read-out channels; a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom; wherein the cover glass is arranged to couple to said UE device to enable transmission of biometric skin (Continued)

Figure 1A:
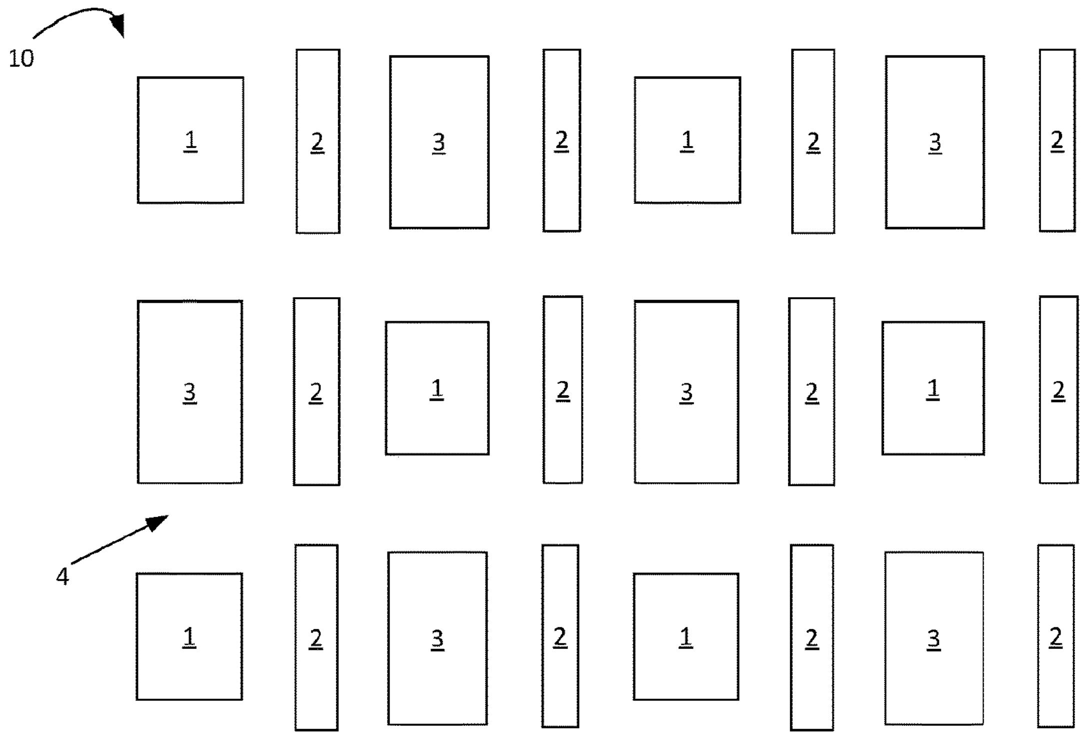

contact data from the conversion circuitry to a processor of said UE device.

19 Claims, 4 Drawing Sheets

(56) References Cited

U.S. PATENT DOCUMENTS

| | | | | |
|---|---|---|---|---|
| 2017/0006245 | A1 | 1/2017 | Akhavan et al. | |
| 2018/0276442 | A1 | 9/2018 | Kim et al. | |
| 2019/0138131 | A1* | 5/2019 | Kim | G06F 3/0443 |
| 2019/0317627 | A1 | 10/2019 | Kim et al. | |
| 2021/0200366 | A1 | 7/2021 | Bok et al. | |
| 2021/0288118 | A1 | 9/2021 | Lee et al. | |
| 2021/0382570 | A1* | 12/2021 | Jeon | G06F 3/04842 |
| 2022/0345555 | A1* | 10/2022 | Kim | G06F 3/0418 |

OTHER PUBLICATIONS

Examination Report issued in GB2116352.2 (Apr. 11, 2022).
Search Report & Written Opinion issued in PCT/GB2022/052885 (Jan. 27, 2023).

* cited by examiner

APPARATUS AND METHOD

CROSS-REFERENCE TO RELATED APPLICATIONS

This application is a US national stage application under Section 371 of PCT Application No. PCT/GB2022/052885, filed on Nov. 14, 2022, which claims priority from United Kingdom Patent Application No. GB 2116348.0, filed on Nov. 12, 2021, and United Kingdom Patent Application No. GB 2116352.2, filed on Nov. 12, 2021, the contents of which are each incorporated by reference herein in their entireties.

TECHNICAL FIELD

The present disclosure relates to biometric skin contact sensors designed for use with display screens. In particular, the present disclosure provides devices having displays with biometric skin contact sensors provided thereon, as well as sensors designed to be placed on such devices, and methods of designing and using such sensors.

BACKGROUND

Modern display screens typically work by outputting light from different regions of the display. Such display screens are provided by an array of active regions through which light is output and inactive regions which do not output any light. The active regions may be pixels or sub-pixels, and different active regions may emit different coloured light. Display screens typically utilise red, green and blue light to provide multicoloured displays although other colour combinations are also possible. Examples of such display screen technologies include Liquid Crystal Display (LCD) screens and Organic Light-Emitting Diode (OLED) display screens.

For an LCD screen, a backlight emits light which passes through active regions of the display. Each active region on an LCD display includes one or more filters so that the light output from that active region has certain properties (e.g. to control colour, brightness, intensity etc.). For an OLED display screen, each active region emits light itself to be output from the display. Each active region on an OLED display will therefore emit light, and that active region may be selected to emit light having certain properties (e.g. to control colour, brightness, intensity etc.).

For these display screens, there are a number of different pixel arrangements which can be used to specify how the different pixels should be spatially arranged, and the location for pixels of each of the three colours. These arrangements are designed to provide higher image quality and resolution for such display screens. A transparent protective layer is then provided over the display to protect the active elements of the display. To try to maximise image quality, such protective layers are designed to be as thin and transparent as possible while still providing sufficient protection for the components of the display screen.

SUMMARY

Aspects of the disclosure are set out in the independent claims and optional features are set out in the dependent claims. Aspects of the disclosure may be provided in conjunction with each other, and features of one aspect may be applied to other aspects.

In an aspect, there is provided a cover glass configured to overlie a display screen of a user equipment ('UE') device. The cover glass comprising: a substrate arranged to overlie a said display screen for protecting said display screen, wherein the substrate has a display-facing surface and a user-facing surface; and a capacitive biometric skin contact sensor coupled to the substrate and configured to resolve the contours of skin proximal to the sensor, the sensor comprising: a plurality of gate drive channels; a plurality of read-out channels; a sensor array of sensor pixels, wherein each sensor pixel comprises a thin film transistor and an at least partially transparent capacitive sensing electrode coupled to the thin film transistor, and wherein each of the sensor pixels is coupled to both: (i) agate drive channel to receive a scanning signal; and (ii) a read-out channel to provide a read-out signal; and conversion circuitry configured to process read-out signals received from sensor pixels to obtain biometric skin contact data therefrom; wherein the cover glass is arranged to couple to said UE device to enable transmission of biometric skin contact data f rom the conversion circuitry to a processor of said UE device.

The cover glass may be a UE cover glass arranged for use with a selected type of UE. A UE may comprise any digital device having a display. For example, the UE may comprise a mobile telecommunications apparatus, such as a mobile phone (cellular phone), a tablet, a laptop, a desktop computer, a smart watch, a display screen (e.g. a TV) or any other digital technology with a display screen and a processor. For example, aspects of the present disclosure may provide a mobile phone cover glass (e.g. cover glasses disclosed herein may be mobile phone cover glasses). The skin contact sensor may be arranged on the user-facing surface of the substrate. The skin contact sensor may comprise a cover layer configured to be touched by a user of said UE device, the cover layer overlying a user-facing side of the skin contact sensor. Each sensor pixel may have a plurality of layers comprising a first conductive layer (e.g. deposited) on a display-facing surface of the cover layer and arranged to provide the capacitive sensing electrode of the sensor pixel. The skin contact sensor may be laminated onto the substrate or built directly onto the substrate. The UE cover glass may comprise laminate (e.g. from laminating the skin contact sensor onto the substrate). The skin contact sensor may be arranged on the display-facing surface of the substrate. Each sensor pixel may have a plurality of layers comprising a first conductive layer (e.g. deposited) on the display-facing surface of the substrate and arranged to provide the capacitive sensing electrode of the sensor pixel.

The substrate may comprise one or more reference features arranged to enable a selected alignment to be provided between the cover glass and said display screen of said UE device. The one or more reference features may comprise at least one of: (i) one or more edges of the substrate, and (ii) one or more reference indicia provided on the substrate. The skin contact sensor may be coupled to the substrate and aligned relative to the one or more reference features. The cover glass may be arranged to provide a selected offset between the skin contact sensor and the one or more reference features. A pattern for the gate drive channels, read-out channels, and/or sensor array of sensor pixels may be arranged to have a selected offset (e.g. spatial offset) relative the one or more reference features. The skin contact sensor may comprise one or more reference features. The skin contact sensor may be coupled to the substrate with the reference features of the skin contact sensor aligned relative to the reference features of the substrate.

Said display screen of said UE device may comprise a display array having: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions; wherein the skin contact sensor may be arranged with its non-transparent components (e.g. one or more of the thin film transistors, gate drive channels and read-out channels) in a second grid-like structure; and wherein the second grid like structure is selected to match the first grid-like structure to enable the cover glass to be installed on said display screen so that light output from said active regions of said display array passes through the sensor. At least some of the capacitive sensing electrodes of the sensor array may be arranged to overlie at least some of the active regions of the display array when the cover glass is installed on the display screen so that light output from said active regions passes through said at least partially transparent capacitive sensing electrodes. The capacitive sensing electrodes may be distributed across the sensor array according to a second repeating pattern. The second repeating pattern may be selected to match at least a subset of the first repeating pattern so that the at least partially transparent capacitive sensing electrodes overlie at least some of said active regions of said display array when the cover glass is installed on said display screen. The sensor array of sensor pixels may cover a majority of the substrate. The second grid-like structure may also set out the arrangement for the capacitive sensing electrode and/or a reference capacitor (if included).

The capacitive sensing electrode may be provided in a user-facing layer of the sensor pixel. The capacitive sensing electrode of each sensing pixel may cover the majority of the area of the sensor pixel. Each capacitive sensing electrode may have an area selected based on a capacitance associated with that electrode. For example, the area of the electrode may have an increased area when the layer separating the electrode from the user is thicker, and vice-versa. In other words, the capacitive sensing electrode may have an area selected to provide a desired capacitive response from user interaction with the device. Where the layer separating the capacitive sensing electrode from the user is thinner, the electrode may take up less of the cross-sectional area of each sensor pixel. The capacitive sensing electrode may have an area which is as large as it can be for each sensor pixel (e.g. to maximise measurement sensitivity).

In an aspect, there is provided a user equipment ('UE') device comprising: a display screen; a processor; and a cover glass comprising a substrate and a capacitive biometric skin contact sensor coupled to the substrate and configured to resolve the contours of skin proximal to the sensor; wherein the cover glass overlies the display screen for protection thereof; and wherein the capacitive biometric skin contact sensor comprises: a plurality of gate drive channels; a plurality of read-out channels; a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom, and to transmit biometric skin contact data to the processor.

The display screen may comprise a display array having: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions. The skin contact sensor may be arranged with its non-transparent components (e.g. one or more of the thin film transistors, gate drive channels and read-out channels) in a second grid-like structure. The second grid like structure may match the first grid-like structure to enable light output from active regions of the display array to pass through the sensor. In other words, the second grid-like structure may be configured to maximise light transmission from the display (e.g. to maximise the amount of light passing through the sensor f rom the display when the sensor is installed on the intended display screen). The display screen may have a repeating pattern for the active and inactive regions. The inactive regions may be interleaved between the active regions.

In an aspect, there is provided a method of providing a cover glass configured to overlie a display screen of a user equipment ('UE') device, wherein the method comprises: coupling a capacitive biometric skin contact sensor to a substrate to provide the cover glass; wherein the substrate is arranged to overlie a said display screen of a said UE device for protecting said display screen, and wherein the substrate has a display-facing surface and a user-facing surface; wherein the capacitive biometric skin contact sensor comprises: a plurality of gate drive channels; a plurality of read-out channels; a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom; wherein the cover glass is arranged to couple to said UE device to enable transmission of biometric skin contact data from the conversion circuitry to a processor of said UE device.

Coupling the skin contact sensor to the substrate may comprise laminating the skin contact sensor onto a user-facing surface of the substrate with a cover layer overlying a user-facing side of the skin contact sensor, the cover layer being configured to be touched by a user of said UE device. Coupling the skin contact sensor to the substrate may comprise building the skin contact sensor on top of the user-facing surface of the substrate with a cover layer overlying a user-facing side of the skin contact sensor, the cover layer being configured to be touched by a user of said UE device. Coupling the skin contact sensor to the substrate may comprise providing (e.g. depositing) a first conductive layer on the display-facing surface of the substrate for each sensor pixel, each said conductive layer providing the capacitive sensing electrode of the sensor pixel. Said display screen of said UE device may comprise a display array having: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions. The method may comprise selecting the biometric skin contact sensor so that the sensor is arranged with its non-transparent components (e.g. the thin film transistors, gate drive channels and/or read-out channels) in a second grid-like structure selected to match the first grid-like structure to enable the cover glass to be installed on said display screen so that light output from said active regions of said display array passes through the sensor.

In an aspect, there is provided a method of providing a user equipment ('UE') device, wherein the method comprises: providing a cover glass as disclosed herein; and installing the cover glass on the display screen of the UE device; wherein installing the UE device cover glass on the display screen comprises aligning the UE device cover glass with the display screen so that the second grid-like structure of the non-transparent components of the sensor (e.g. the thin film transistors, gate drive channels and/or read-out channels) of the UE device cover glass matches the first grid-like structure of inactive regions of the display array so that light output from the active regions of the display array passes through the sensor.

In an aspect, there is provided a capacitive biometric skin contact sensor configured to resolve the contours of skin proximal to the sensor and arranged to be coupled to a substrate to provide a cover glass, wherein said substrate is arranged to overlie a display screen of a user equipment ('UE') device for protecting said display screen, and wherein said display screen comprises a display array having: (i) a plurality of active regions comprising display pixels and/or display subpixels, wherein the active regions are distributed across the display array according to a first repeating pattern; and (ii) a plurality of inactive regions, wherein the inactive regions are arranged in a first grid-like structure so that the active regions are separated from each other by the inactive regions, the skin contact sensor comprising: a plurality of gate drive channels; a plurality of read-out channels; a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom and to transmit biometric skin contact data to a processor of said UE device; wherein the skin contact sensor is arranged with the non-transparent components of the sensor (e.g. the thin film transistors, gate drive channels and/or read-out channels) in a second grid-like structure; and wherein the second grid like structure is selected to match the first grid-like structure to enable the sensor to be coupled to said substrate to provide said cover glass, and said cover glass to be installed on said display screen so that light output from said active regions of said display array passes through the sensor.

In an aspect, there is provided a device comprising: a display screen having a display array comprising: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions; a capacitive biometric skin contact sensor configured to resolve the contours of skin in contact with the sensor, wherein the sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) a gate drive channel to receive a scanning signal; and (ii) a read-out channel to provide a read-out signal; wherein the non-transparent components of the sensor (e.g. the thin film transistors, gate drive channels and/or read-out channels) are arranged in a second grid-like structure; wherein the sensor overlies the display array and the second grid-like structure matches the first grid-like structure to enable light output f rom active regions of the display array to pass through the sensor.

Each sensor pixel may comprise a reference capacitor, and wherein for each sensor pixel, the reference capacitor and the capacitive sensing electrode may be connected to a gate region of the thin film transistor. At least some of the capacitive sensing electrodes of the sensor array may overlie at least some of the active regions of the display array so that light output from said active regions passes through said at least partially transparent capacitive sensing electrodes. The capacitive sensing electrodes may be distributed across the sensor array according to a second repeating pattern. The second repeating pattern may match at least a subset of the first repeating pattern so that the at least partially transparent capacitive sensing electrodes overlie at least some of the active regions of the display array. The second repeating pattern may be selected so that capacitive sensing electrodes overlie some, but not all, of the active regions of the display array. The second repeating pattern may be selected so that capacitive sensing electrodes overlie selected active regions of the display, wherein the selected active regions may be selected based on a property of the light they output. The selected active regions may be selected based on a colour of the light they output, for example so that the capacitive sensing electrodes overlie active regions which output blue light. The display screen may comprise an LCD screen and/or an OLED screen. The sensor may overlie a top surface of the display array. The sensor may comprise a substrate arranged to overlie the capacitive sensing electrodes.

The capacitive sensing electrodes may be distributed across the sensor array so that each capacitive sensing electrode at least partially overlies at least one active region of the display. Each capacitive sensing electrode may be provided in a user-facing layer of its sensor pixel. Each capacitive sensing electrode may cover a majority of the area of its sensor pixel. The capacitive sensing electrodes may be distributed across the sensor array so that capacitive sensing electrodes cover the majority of the sensor array. The capacitive sensing electrodes may be distributed across the display array so that capacitive sensing electrodes cover the majority of the display array.

For each sensor pixel: the reference capacitor may be connected in series with the capacitive sensing electrode so that, in response to a control voltage, an indicator voltage is provided at the connection between the reference capacitor and the capacitive sensing electrode to indicate a proximity to the capacitive sensing electrode of a conductive object to be sensed; and the thin film transistor may comprise a sense voltage-controlled impedance having a control terminal connected so that the impedance of the sense voltage-controlled impedance is controlled by the indicator voltage. Each sensor pixel may comprise a reset circuit for setting the control terminal of the sense voltage-controlled impedance to a reset voltage selected to tune the sensitivity of the pixels.

In an aspect, there is provided a method of manufacturing a device, wherein the device comprises: a display screen having a display array comprising: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions; a capacitive biometric skin contact sensor configured to resolve the contours of skin in contact with the sensor, wherein the sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) a gate drive channel to receive a scanning signal; and (ii) a read-out channel to provide a read-out signal; wherein the non-transparent components of the sensor (e.g. the thin film transistors, gate drive channels and/or read-out channels) are arranged in a second grid-like structure, and wherein the second grid-like structure matches the first grid-like structure; wherein the method comprises: overlying the sensor over the display array to enable light output from active regions of the display array to pass through the sensor. The method may comprise laminating the sensor to the display array. For example, the sensor may be laminated onto a substrate, and that substrate (with sensor installed thereon) may be laminated onto the display. The sensor may overlie a top surface of the display array. The method may comprise providing a connection between the biometric sensor and a controller of the device to enable the controller to obtain an indication of biometric sensor data obtained from the biometric sensor.

In an aspect, there is provided a method of designing a capacitive biometric skin contact sensor configured to resolve the contours of skin in contact with the sensor, wherein the sensor is designed to overlie a display screen having a display array comprising: (i) a plurality of active regions comprising display pixels and/or display subpixels, wherein the active regions are distributed across the display array according to a first repeating pattern, and (ii) a plurality of inactive regions, wherein the inactive regions are arranged in a first grid-like structure so that the active regions are separated from each other by the inactive regions, and wherein the biometric sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) a gate drive channel to receive a scanning signal; and (ii) a read-out channel to provide a read-out signal; wherein the method comprises: identifying the arrangement of the first grid-like structure; and determining a second grid-like structure according to which the non-transparent components of the sensor (e.g. the thin film transistors, the gate drive channels, and/or the read-out channels) are to be arranged, wherein the second grid-like structure is determined to match the first grid-like structure to enable the sensor to overlie the display array so that light output from active regions of the display array passes through the sensor. The method may comprise determining a second repeating pattern according to which the at least partially transparent capacitive sensing electrodes are arranged, wherein the second repeating pattern matches at least a subset of the first repeating pattern so that the at least partially transparent capacitive sensing electrodes overlie at least some of the active regions of the display. The method may comprise identifying a plurality of sub-regions of the display, wherein each sensor pixel will correspond to sub-region of the display array; and designing the spatial arrangements for the sensor pixel so that non-transparent components of the sensor pixel overlie inactive regions of the display.

In an aspect, there is provided a method of manufacturing a capacitive biometric skin contact sensor configured to resolve the contours of skin in contact with the sensor, wherein the sensor is designed to overlie a display screen having a display array comprising: (i) a plurality of active regions comprising display pixels and/or display subpixels, wherein the active regions are distributed across the display array according to a first repeating pattern, and (ii) a plurality of inactive regions, wherein the inactive regions are arranged in a first grid-like structure so that the active regions are separated from each other by the inactive regions, the method comprising: designing the biometric sensor as disclosed herein; and providing the designed biometric sensor.

In an aspect, there is provided a capacitive biometric skin contact sensor configured to resolve the contours of skin in contact with the sensor, wherein the sensor is configured to overlie a display screen having a display array comprising: (i) a plurality of active regions comprising display pixels and/or display subpixels, wherein the active regions are distributed across the display array according to a first repeating pattern, and (ii) a plurality of inactive regions, wherein the inactive regions are arranged in a first grid-like structure so that the active regions are separated from each other by the inactive regions, wherein the sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) agate drive channel to receive a scanning signal; and (ii) a read-out channel to provide a read-out signal; wherein the non-transparent components of the sensor (e.g. the thin film transistors, gate drive channels and/or read-out channels) are arranged in a second grid-like structure; wherein the second grid-like structure is selected to match the first grid-like structure to enable the sensor to overlie the display array so that light output from active regions of the display array passes through the sensor. The sensor may comprise a substrate configured to facilitate lamination of the sensor onto the display screen. For example, the substrate may comprise a film with an adhesive layer for facilitating lamination (e.g. a release film).

In an aspect, there is provided a kit of parts comprising: a display screen having a display array comprising: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions; a capacitive biometric skin contact sensor configured to resolve the contours of skin in contact with the sensor, wherein the sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) a gate drive channel to receive a scanning signal; and (ii) a read-out channel to provide a read-out signal; wherein the non-transparent components of the sensor (e.g. the thin film transistors, gate drive channels and read-out channels) are arranged in a second grid-like structure; and wherein the second grid-like structure matches the first grid-like structure to enable the sensor to overlie the display array so that light output from active regions of the display array passes through the sensor.

In an aspect, there is provided a method of operating a device, wherein the device comprises: a display screen having a display array comprising: a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions; a capacitive biometric skin contact sensor configured to resolve the contours of skin in contact with the sensor, wherein the sensor comprises: a plurality of gate drive channels; a plurality of read-out channels; and a sensor array of sensor pixels, wherein each sensor pixel comprises a thin film transistor and an at least partially transparent capacitive sensing electrode connected to the thin film transistor, and wherein each of the sensor pixels is connected to both: (i) a gate drive channel to receive a scanning signal; and (ii) a read-out channel to provide a read-out signal; wherein the non-transparent components of the sensor (e.g. the thin film transistors, gate drive channels and read-out channels) are arranged in a second grid-like structure; and wherein the second grid-like structure matches the first grid-like structure so that the sensor overlies the display array to enable light output from active regions of the display array to pass through the sensor; wherein the method comprises: obtaining biometric data using the biometric sensor; controlling operation of the device based on the obtained biometric data.

In an aspect, there is provided a cover glass comprising: an optically transparent substrate; a capacitive biometric skin contact sensor provided on the optically transparent substrate; an optically transparent cover layer provided on the capacitive biometric skin contact sensor on the opposite side to the optically transparent substrate; wherein the capacitive biometric skin contact sensor comprises a sensor array of sensor pixels, wherein each sensor pixel comprises capacitive sensing electrode and at least one thin film transistor, TFT; and wherein the optically transparent cover layer is attached to the capacitive biometric skin contact sensor via an optically coupled adhesive layer.

At least one of the substrate and the cover layer may be made of glass. The adhesive may have a thickness of 5 microns or less. The cover layer may have a thickness of 50 microns or less. The cover layer may have a thickness of 35 microns or less. The cover layer may have a hardness of 6H or more, e.g. 9H or more. It is to be appreciated that 'H' refers to the Mohs scale. The cover layer may be made of tempered glass. At least a portion of the sensor may be provided by an at least partially optically transparent electrical conductor. The capacitive sensing electrode of each sensor pixel may be made of an optically transparent material. The cover layer may have a minimum bend radius of under 2 mm. The substrate and/or the cover layer may be made of a polyimide material. The cover glass may be configured for installation on a display of a device. The optically coupled adhesive layer may be optically tuned to the display of the device and/or optical properties of the cover glass. The cover glass may have one or more reference features thereon arranged to facilitate correct alignment of the cover glass onto the display. The reference features of the cover glass may be configured to be aligned with corresponding reference features of the display screen such that the cover glass will be arranged on the display in the correct alignment if the reference features of the cover glass are correctly aligned with the reference features of the display. The reference features on the cover glass may comprise indicia. The sensor may be configured to align with the display to provide biometric skin contact sensing while appearing substantially transparent to light output from active regions of a display of the device. The cover glass may comprise at least one reference feature, and wherein the sensor array of sensor pixels of the biometric skin contact sensor may be arranged at a selected offset from said at least one reference feature. The tolerance for the selected offset of the sensor array from the at least one reference feature may be less than a pixel pitch for the sensor pixels of the sensor array. The tolerance for the selected offset of the sensor array from the at least one reference feature may be less than a pixel pitch for the pixels and/or sub-pixels of the display screen. The tolerance may be less, e.g. under 10 microns, such as under 5 microns, e.g. under 4 microns, e.g. under 3 microns, e.g. under 2 microns, e.g. between 1 to 3 microns. The cover layer may have a dielectric constant of 5 or more. The cover glass may be configured to be attached, optionally laminated, onto the display. The sensor may be laminated onto the substrate.

In an aspect, there is provided a device comprising: a display; a capacitive biometric skin contact sensor arranged on a user-facing side of the display, the capacitive biometric skin contact sensor comprising a sensor array of sensor pixels, wherein each sensor pixel comprises a capacitive sensing electrode and at least one thin film transistor, TFT; and an optically transparent cover layer arranged on a user-facing side of the sensor; wherein the cover layer is attached to the capacitive biometric skin contact sensor via an optically coupled adhesive layer. The device may further comprise a first protective layer arranged on a user-facing surface of the display. The sensor may be arranged on a user-facing surface of the first protective layer, e.g. so that the first protective layer separates the sensor from the display (and e.g. the optically transparent cover layer separates the sensor from the user interacting with the sensor).

Aspects of the present disclosure may comprise one or more computer program products comprising computer program instructions configured to program a computer to perform any of the methods disclosed herein.

FIGURES

Some examples of the present disclosure will now be described, by way of example only, with reference to the figures, in which:

FIG. 1*a* is a schematic diagram of an exemplary display screen arrangement.

Figure 1B:
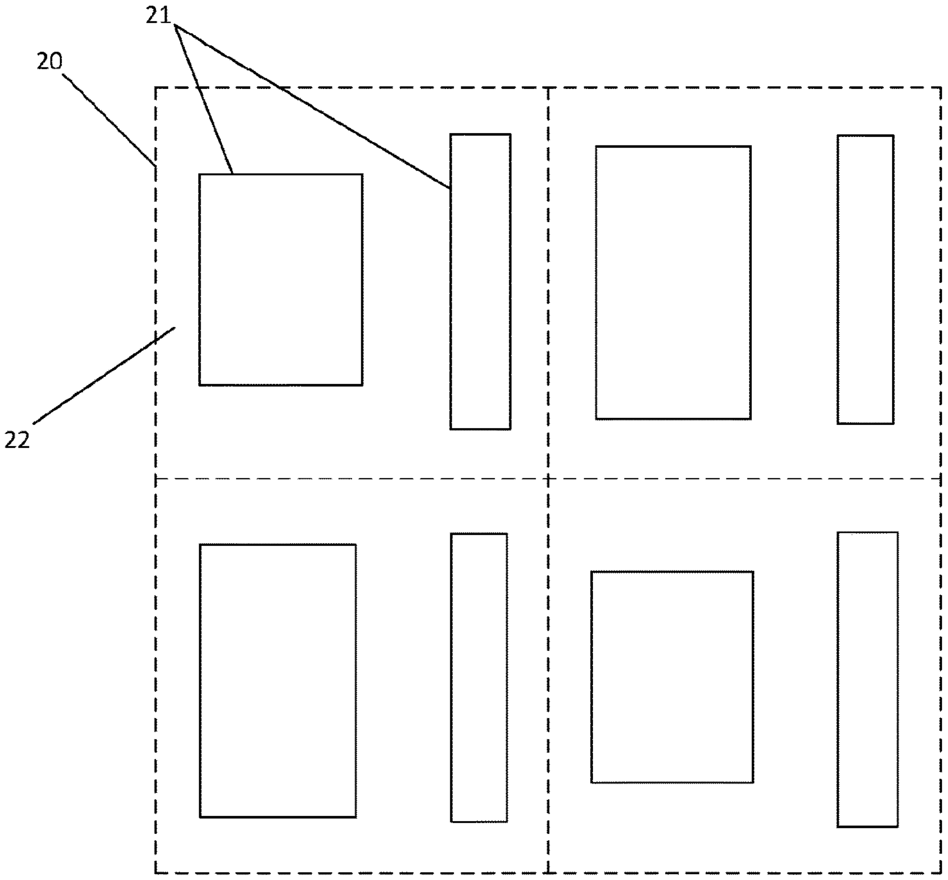

FIG. 1*b* is a schematic diagram of a portion of an exemplary display screen.

Figure 2A:
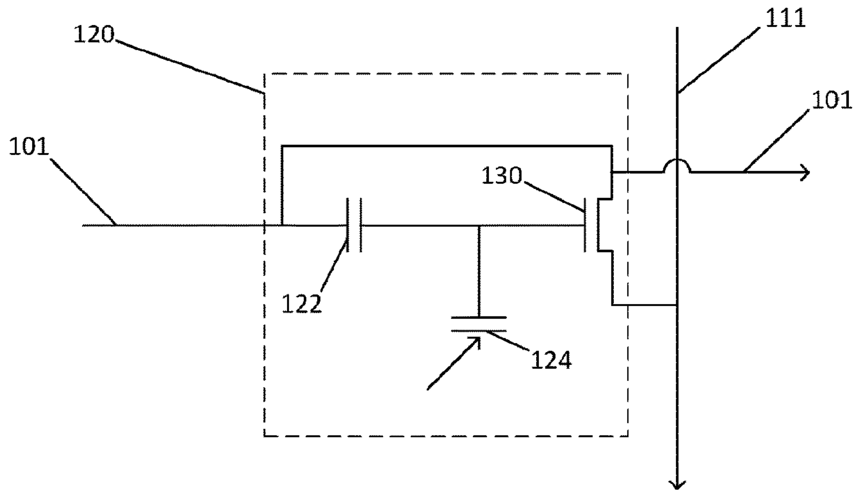
Figure 2B:
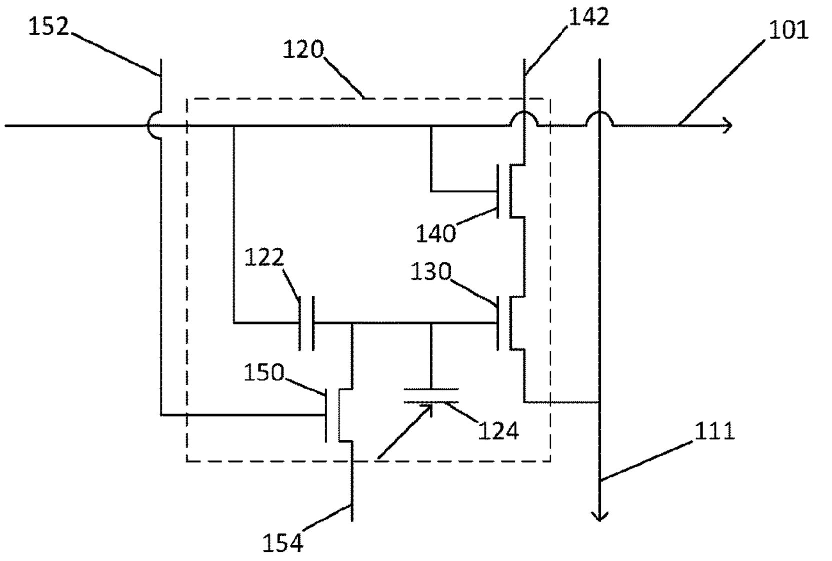
Figure 2C:
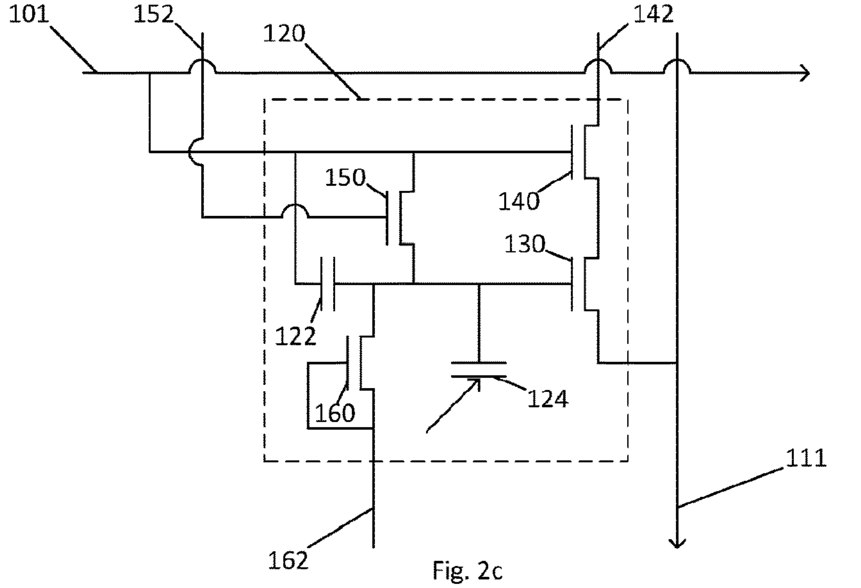

FIGS. 2*a* to 2*c* each show a schematic diagram of an exemplary sensor pixel for a capacitive biometric skin contact sensor.

Figure 3:
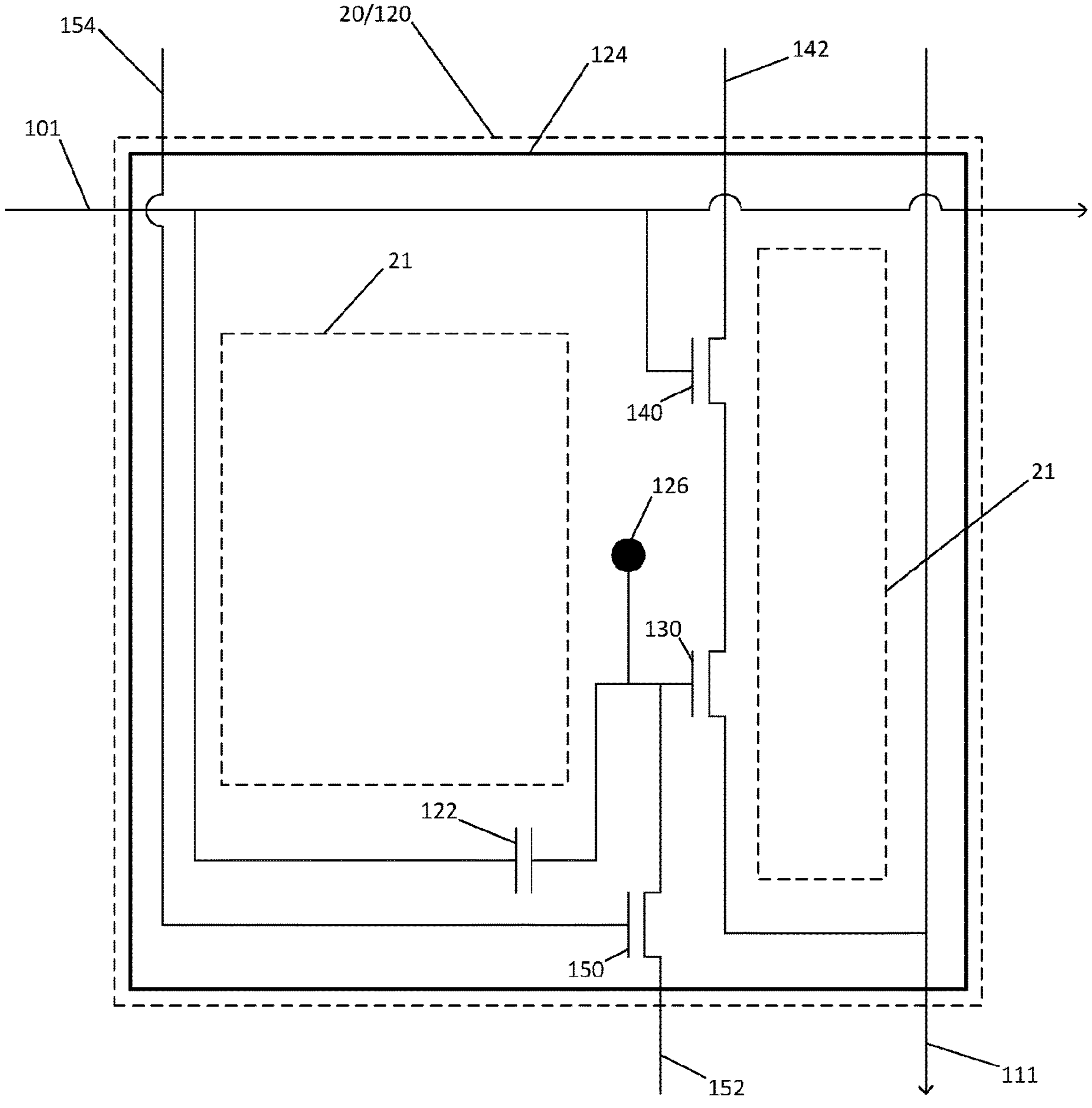

FIG. 3 is a schematic diagram of a portion of an exemplary capacitive biometric skin contact sensor overlying a portion of an exemplary display screen.

Figure 4A:
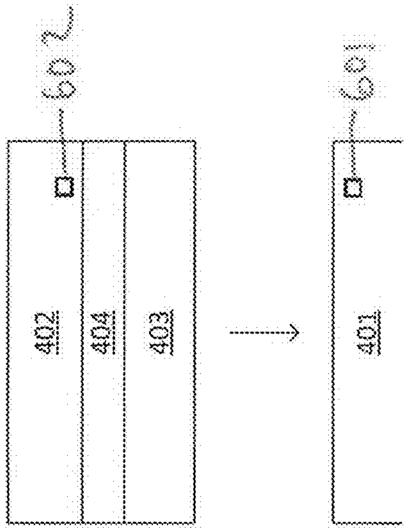
Figure 4B:
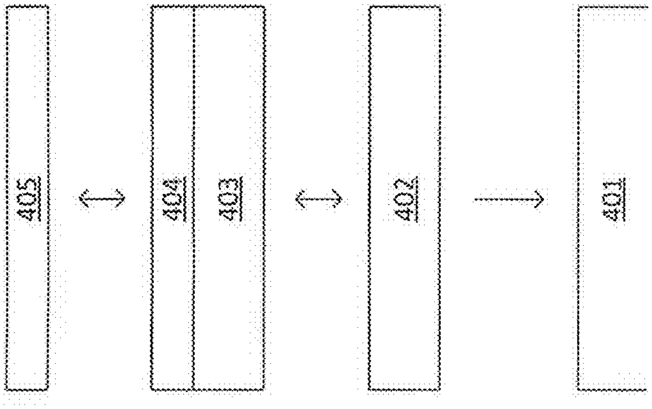
Figure 4C:
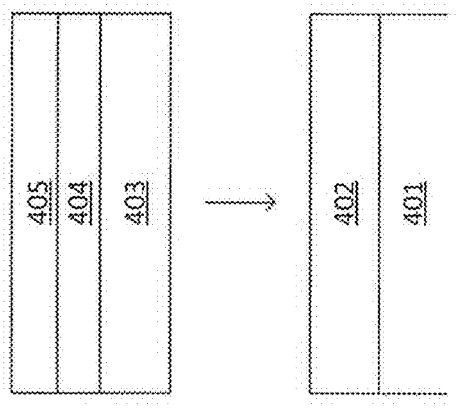

FIGS. 4*a* to 4*c* are schematic diagrams illustrating across-sectional view of exemplary approaches for providing a capacitive biometric skin contact sensor on a display screen.

Figure 4D:
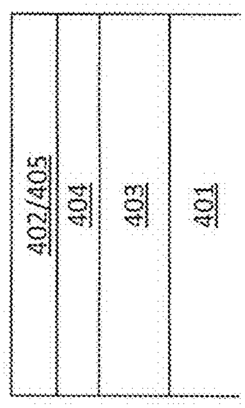
Figure 4E:
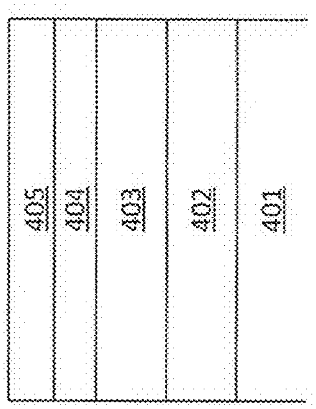

FIGS. 4*d* and 4*e* are schematic diagrams illustrating a cross-sectional view of two examples of a capacitive biometric skin contact sensor arranged on a display screen.

In the drawings like reference numerals are used to indicate like elements.

SPECIFIC DESCRIPTION

Embodiments of the present disclosure relate to capacitive biometric skin contact sensor designs which enable the sensor to be provided on a display screen so that the display may still function as intended, while also enabling a user-facing surface to provide biometric skin contact sensing. For this, less transparent (or opaque) components of the sensor may be arranged to overlie inactive regions of the display. Some of the components of the sensor may be provided by transparent materials, and these components may at least partially overlie some of the active regions of the display. As such, the arrangement of different components of a sensor may be designed based on the type of display for which that sensor is intended to be used. Standalone sensors may be provided which are designed to be installed on such display screens. Display screens may also be provided which already incorporate such a sensing arrangement. In some examples, the sensor may be provided as part of a cover glass for protecting the display screen, where that cover glass is arranged so that it can be installed onto the display screen to enable the display to work as intended, while also enabling biometric scanning to occur, as well as protection of the relevant components.

Embodiments of the present disclosure relate to a cover glass having a capacitive biometric skin contact sensor provided on an optically transparent substrate, with an optically transparent cover layer on the sensor (on the opposite side to the substrate). The cover layer is attached to the sensor via an optically coupled adhesive layer.

Reference will first be made to FIGS. 1*a* and 1*b*, which shows an exemplary display screen. Reference will then be made to FIGS. 2*a* to 2*c*, which show exemplary pixel designs for a sensor, and then reference will be made to FIG. 3, which shows how a sensor may be provided on such a display screen to enable biometric sensing to occur alongside the displaying functionality for that display screen.

FIG. 1*a* shows a display array 10. The display array 10 includes a plurality of active regions, which are shown as rectangles, and an inactive region, which is the region separating the rectangles. In FIG. 1*a*, there are three different types of active region (the three different types of rectangles), and an inactive region 4. Each active region of the display is arranged to output light. The inactive region will not output light.

In the example shown in FIG. 1*a*, the display array 10 is a PenTile® display array. In particular, FIG. 1*a* represents a PenTile RGBG® display array. For this, the three different types of active region correspond to red, green and blue light. One pixel of this array may encompass a plurality of different active regions. In other words, one display pixel may be formed from a plurality of sub-pixels. In FIG. 1*a*, the active regions of the display are split into three types: red sub-pixels 1, green sub-pixels 2, and blue sub-pixels 3. The green sub-pixels 2 are interleaved with alternating red 1 and blue 3 sub-pixels. The green sub-pixels 2 are taller and thinner than blue 3 and red 1, and the blue 3 sub-pixels are taller than the red 1 sub-pixels. Typically, the green sub-pixels will have a higher brightness output, and so the contribution of green light to the display is split into two smaller sub-pixels in each repeating portion of the display array 10.

The active regions are arranged in a regular, repeating pattern. The inactive region 4 forms a grid-like structure separating each active region from its adjacent active regions. For example, the grid-like structure of the inactive region 4 includes two sets of perpendicular branches. The grid-like structure includes a first series of parallel channels which are adjacent to each other but separated by active regions of the display. The grid-like structure also includes a second series of parallel channels, which run perpendicular to the first series of parallel channels, and which are adjacent to each other but separated by active regions of the display. In the example shown in FIG. 1*a*, the first series of parallel channels run along a y-axis for the display, and the second series of parallel channels run along an x-axis for the display. In other words, the inactive region 4 defines a criss-cross type pattern (e.g. where the regions of the display not conforming to this pattern provide active regions of the display).

FIG. 1*b* shows a zoomed-in portion of the display array 10 of FIG. 1*a*. For simplicity, instead of referring to the colour of the sub-pixels, reference will now be made to active regions 21 and the inactive region 22. The dashed lines of FIG. 1*b* divide the portion of the display array 10 into a plurality of sub-regions 20. In FIG. 1*b*, four sub-regions 20 are shown. As such, each sub-region 20 includes two active regions 21 (one red or blue sub-pixel and one green sub-pixel, as per the RGBG arrangement). This particular arrangement is intended to be exemplary, not limiting, as other divisions for the sub-regions 20 may be used. The sensor will also have a repeating pattern formed of a plurality of sensor pixels, and each sensor pixel will be designed to correspond to one sub-region 20 of the display array 10.

Sensors of the present disclosure contain at least some components which are formed of an at least partially transparent material. Other components of the sensors may not be transparent. The sensors will be designed based on the display screen onto which they are to be installed. The arrangement of the components of each sensor is selected so that any non-transparent components will overlie the inactive region of the display (when the sensor is installed on the display). The sensor may be designed so that transparent components of the sensor may at least partially overlie some of the active regions of the display (when the sensor is installed on the display). As such, light output from the active regions of the display may pass through portions of the sensor where there is no material, or through portions of the sensor which are transparent. Thus, the sensor may be arranged to provide a high level of optical transmission when installed on the display.

This principle will be described in more detail below. Firstly, three different sensor pixel designs will now be described with reference to FIGS. 2*a* to 2*c*, and then an exemplary arrangement of such a sensor pixel installed on a display screen will be described with reference to FIG. 3.

FIG. 2*a* shows a sensor pixel 120 for a capacitive biometric skin contact sensor. The sensor pixel 120 includes a capacitive sensing electrode 124 and a voltage-controlled impedance shown as a thin film transistor ('TFT') and referred to hereon in as 'sense TFT 130'. The capacitive sensing electrode 124 is shown with a variable capacitor symbol. It will be appreciated that the capacitive sensing electrode 124 is formed of one electrode (e.g. a plate), and the variable capacitance for this will effectively be provided by a user interacting with that one electrode (e.g. due to the proximity of a portion of the user's skin proximal to the electrode). As will be appreciated, the capacitance associated with this capacitive sensing electrode 124 will vary in dependence on the proximity of the user's skin to the capacitive sensing electrode 124. The sensor pixel 120 also includes a reference capacitor 122. Also shown is a first gate drive channel 101 and a first read-out channel 111.

In the pixel 120 of FIG. 2*a*, a first region of the sense TFT 130 is coupled to the first gate drive channel 101. A second region (e.g. a control terminal) of the sense TFT 130 is coupled to the capacitive sensing electrode 124. A third region of the sense TFT 130 is coupled to the first read-out channel 111. The second region of the sense TFT 130 may be a gate region. The first region of the sense TFT 130 may be a drain region and the third region of the TFT 130 may be a source region. A first electrode of the reference capacitor 122 is coupled to the first gate drive channel 101. A second electrode of the reference capacitor 122 is coupled to the capacitive sensing electrode 124 and the second region of the sense TFT 130. As such, a connection between the second region of the sense TFT 130 and the capacitive sensing electrode 124 is also connected to the second electrode of the reference capacitor 122. Likewise, a connection between the first gate drive channel 101 and the first electrode of the reference capacitor 122 is also connected to the first region of the sense TFT 130.

To operate the sensor pixel 120 shown in FIG. 2*a*, a scanning signal is applied to the sensor pixel 120 through the first gate drive channel 101. As such, current may flow to the first electrode of the reference capacitor 122 and also to the drain region of the sense TFT 130. As a result, some of the current may flow through the sense TFT 130 from drain to source, wherein the amount of current flowing through will depend on the voltage division to the gate region of the sense TFT 130. This gate voltage will vary depending on the capacitive potential division between the reference capacitor 122 and the capacitive sensing electrode 124, which in turn will be representative of the capacitance of the capacitive sensing electrode 124 due to proximity of a conducting body (e.g. a portion of the user's body in proximity to that capacitive sensing electrode 124). As such, a magnitude of the current output from the sensor pixel 120 to the first read-out channel 111 will vary in dependence on the proximity to the capacitive sensing electrode 124 of the conducting body.

FIG. 2*b* shows a sensor pixel 120 for a capacitive biometric skin contact sensor. As with the sensor pixel 120 of FIG. 2*a*, the sensor pixel 120 of FIG. 2*b* includes a reference capacitor 122, a capacitive sensing electrode 124, and a sense TFT 130. A first gate drive channel 101 is shown in FIG. 2*b*, as is a first read-out channel 111. The sensor pixel 120 of FIG. 2*b* also includes a select TFT 140, a select reference connection 142, a reset TFT 150, a first reset reference connection 152, and a second reset reference connection 154.

The select TFT 140 is coupled to the sense TFT 130 to selectively inhibit the sense TFT 130 from outputting a read-out signal to the first read-out channel 111. The select TFT 140 has a conductive channel connected in series between a reference signal supply and the sense TFT 130. A first region of the select TFT 140 is arranged to receive the reference signal supply (via the select reference connection 142). The second region of the select TFT 140 is coupled to the first gate drive channel 101, and a third region of the select TFT 140 is coupled to the first region of the sense TFT 130. As with FIG. 2*a*, the third region of the sense TFT 130 is coupled to the first read-out channel 111. Likewise, a first electrode of the reference capacitor 122 is coupled to the first gate drive channel 101, and a second electrode of the reference capacitor 122 is coupled to both the capacitive sensing electrode 124 and the second region of the sense TFT 130.

Additionally, reset circuitry is also coupled to the second electrode of the reference capacitor 122 (and thus also the second region of the sense TFT 130 and the capacitive sensing electrode 124). The reset circuitry is configured to selectively tune the second region of the sense TFT 130 to a reference voltage (e.g. to provide a selected sensitivity for the pixel 20). A first region of the reset TFT 150 is coupled to the second electrode of the reference capacitor 122, the capacitive sensing electrode 124, and the second region of the sense TFT 130. A second region of the reset TFT 150 is arranged to receive a reset voltage (e.g. via the first reset reference connection 152). The first reset reference connection 152 may be connected to a preceding gate drive channel of the sensor. The reset circuitry is arranged so that, in response to the second region of the reset TFT 150 receiving the reset voltage, a conductive channel is opened between the first and third regions of the reset TFT 150. Current may flow either way through this channel (e.g. it could be arranged to permit current flow in either direction). For example, current may flow into the pixel 120 to charge the second region of the sense TFT 130 to a selected voltage (e.g. to tune its sensitivity). Alternatively, current may flow away from the pixel to discharge the second region of the sense TFT 130. The second reset reference connection 154 thus connects the reset TFT 150 to provide relevant current flow (e.g. it is either connected to a reset reference voltage, or to distribute current elsewhere away from the pixel 120).

To operate the sensor pixel 120 shown in FIG. 2*b*, a preceding scanning signal is applied to the sensor. That is, a scanning signal is applied to a preceding row of gate-drive channels (hereinafter referred to as N−1). The N−1 scanning signal is applied to the second region of the reset TFT 150, which opens up the conductive channel therethrough and thus sets the second region of the sense TFT 130 to the reference voltage. The N−1 scanning signal is then stopped, and thus the conductive channel of the reset TFT 150 is closed. A subsequent scanning signal ('N scanning signal') is then applied to the first gate drive channel 101. As with FIG. 2*a*, this causes a capacitive potential division between the reference capacitor 122, the capacitive sensing electrode 124, and the sense TFT 130, which can be used to determine the proximity to the capacitive sensing electrode of a conductive body to be sensed. Additionally, however, in FIG. 2*b*, the N scanning signal is also applied to the second region of the select TFT 140, which acts to connect the first region of the sense TFT 130 to the reference signal supply, so that the sense TFT 130 may output a current through its third region to the first read-out channel 111 (as described above). Thus, once the N scanning signal is stopped, the sense TFT 130 may no longer output a current to the first read-out channel 111 (as the conductive channel of the select TFT 150 will be closed).

FIG. 2*c* shows a sensor pixel 120 for a capacitive biometric skin contact sensor. As with FIG. 2*b*, the sensor pixel 120 includes a reference capacitor 122, a capacitive sensing electrode 124, a sense TFT 130, a select TFT 140, a select reference connection 142, a reset TFT 150, and a first reset reference connection 152. As shown, the pixel 120 is connected to a first gate drive channel 101 and a first read-out channel 111. Also, the pixel 120 of FIG. 2*c* includes biasing circuitry comprising a bias TFT 160, and a bias reference connection 162.

The sensor pixel 120 shown in FIG. 2*c* is described in more detail in the Applicant's pending application GB 2013864.0. The structural arrangement of this sensor, the function of the sensor and the individual components of the sensor, and the method of operation as described in GB2013864.0 is incorporated herein by reference for all purposes.

The sensor pixel 120 of FIG. 2*c* is similar to that of FIG. 2*b* in that it receives a scanning signal from a gate drive channel which in turn gives rise to a capacitive potential divider arrangement involving the capacitive sensing electrode 124 and the reference capacitor 122. Likewise, this capacitive potential division controls operation of a TFT (sense TFT 130) to regulate the current output f rom the pixel in dependence on the proximity to the capacitive sensing electrode 124 of a conductive body to be sensed.

The sensor pixel 120 of FIG. 2*c* includes biasing circuitry comprising a one-way conduction path from a bias voltage connection to a control terminal of the sense TFT 130 so that current flows from the bias voltage towards the control terminal of the sense TFT 130 in response to the control terminal voltage of the sense TFT 130 dropping below a floor value. In other words, the biasing circuitry of the sensor pixel 120 is arranged to ensure that prior to making a measurement, the voltage at the control terminal (e.g. gate region) of the sense TFT 160 is at a selected value (e.g. a predefined voltage). The bias voltage may be varied to provide a selected voltage at the gate region of the sense TFT 130 (e.g. to provide a selected level of sensitivity for the sensor, or a define operation point for starting operation of the pixel). As shown in FIG. 2*c*, the biasing circuitry comprises a connection to the bias voltage (via bias reference connection 162) and the bias TFT 160. The bias TFT 160 is connected in diode configuration to provide the one-way conduction path. The drain of the bias TFT 160 is coupled to each of the second electrode of the reference capacitor 122, the capacitive sensing electrode 124 and the gate region of the sense TFT 130.

As with FIG. 2*b*, the sensor pixel 120 of FIG. 2*c* includes reset circuitry selectively operable to provide a reference voltage on the reference capacitor 122. The reset circuitry includes the reset TFT 150. The reset TFT 150 is selectively operable to provide a conductive path between the two electrodes of the reference capacitor 122 (e.g. to short the capacitor to zero voltage). A gate region of the reset TFT 150 is coupled to receive a reset voltage in order to open the conductive channel through the reset TFT 150 and short the reference capacitor 122. The gate region of the reset TFT 150 is arranged to receive a reference voltage to selectively open a conductive path through the reset TFT 150. The first reset reference connection 152 couples the second region of the reset TFT 150 to receive this reference voltage. As shown, this may comprise connecting the second region of the reset TFT 150 to a preceding gate drive channel in the sensor array (e.g. an N−1 gate drive channel). A first region of the reset TFT 150 is coupled to the first electrode of the reference capacitor 122 and the third region of the reset TFT 150 is coupled to the second electrode of the reference capacitor. Thus, a voltage for the reference capacitor 122 will be reset to zero in response to application of an N−1 scanning signal to the relevant preceding gate drive channel.

As with FIG. 2*b*, the sensor pixel 120 of FIG. 2*c* may include select circuitry to selectively couple the sense TFT 130 to the supply voltage. The select circuitry includes the select TFT 140, which is arranged to function in a similar manner to the select TFT 140 of FIG. 2*b*.

To operate the sensor pixel 120 of FIG. 2*c* to obtain a measurement, a reset signal is first applied to the reset circuitry. This may comprise a signal from a preceding gate drive channel (e.g. an N−1 scanning signal) being applied to the gate region of the reset TFT 150. In turn, this will cause the reference capacitor 122 to be shorted, and its voltage returned to zero. Then, the biasing circuitry will operate to charge the control terminal of the sense TFT 130 to its floor value. This may comprise the bias voltage being applied to the (diode-connected) bias TFT 160 so that current flows through the bias TFT 160 and charges the gate region of the sense TFT 130 being charged to a selected voltage (the floor value). After the sense TFT 130 has been charged to the floor value, a scanning signal is then applied to the sensor pixel 120 (e.g. an N scanning signal). The scanning signal may act to charge up the first electrode of the reference capacitor 122 and also to apply a voltage to the gate region of the select TFT 140. Current may then flow from the supply voltage through the select TFT 140 and to the sense TFT 130 for obtaining a read-out current therefrom (as described above with reference to FIG. 2*b*).

The biometric skin contact sensor may be formed of an array of sensor pixels (e.g. of any of the types disclosed herein). The sensor pixels of the sensor are arranged in a grid-like array. The sensor pixels are arranged in a regular repeating pattern. In other words, the sensor pixels may form a series of adjacent rectangles (e.g. squares). The sensor pixels are arranged in a series of rows and columns. Each sensor pixel 120 in a row is aligned with the other sensor pixels in that row. Each sensor pixel 120 in a column is aligned with the other sensor pixels in that column. The sensor array may be designed to span across some, or all, of the display screen (e.g. it may cover a majority of the screen and/or may be located over a region of the screen with which a user will predominantly interact). Each sensor pixel 120 is arranged closely enough to its neighbouring sensor pixel 120 to enable the sensor pixels to resolve the difference between ridges and valleys in a user's skin. The sensor spans a surface area large enough to enable sufficient biometric data to be obtained for a user interacting with the display.

The sensor may include a plurality of gate drive channels, and a plurality of read-out channels. Each gate drive channel may be coupled to a plurality of sensor pixels (e.g. to each sensor pixel in a row). Each read-out channel may be coupled to a plurality of sensor pixels (e.g. to each sensor pixel in a column). Each sensor pixel 120 has an associated gate drive channel and read-out channel. The read-out channels run perpendicular to the gate drive channels. The read-out channels and gate drive channels are arranged in an active-matrix pattern (e.g. which forms a criss-cross pattern across the sensor).

The sensor comprises gate drive circuitry and read-out conversion circuitry. The gate drive circuitry is arranged to selectively apply scanning signals to the gate drive channels, e.g. as described above for activating sensor pixels. The conversion circuitry is arranged to receive read-out signals from the read-out channels and to process the read-out signals to obtain biometric skin contact data there from. For example, the conversion circuitry is configured to receive a read-out current from a read-out channel, and to determine therefrom an indication of proximity. For example, this may comprise analogue to digital conversion, such as by using an integrator to integrate the received current. By sensing from a number of different sensor pixels, data may be obtained for a sufficiently large enough region to provide biometric identification (e.g. to identify biometric markers, such as ridges and valleys, on a subject's skin in contact with the sensor). The sensor may also include one or more reference voltage providers, such as for use with the sensor pixels of FIGS. 2*b* and 2*c*. For example, to provide a reference voltage to the select TFT 140 and/or bias TFT 160.

Each sensor pixel 120 may be defined by the region circumscribed by two adjacent gate drive channels and two adjacent read-out channels. At least one of the two adjacent gate drive channels is configured to supply a scanning signal to the sensor pixel 120. At least one of the two adjacent read-out channels is configured to transmit a read-out signal from the sensor pixel 120 to conversion circuitry of the sensor. Additionally, each sensor pixel 120 may be coupled to one or more other gate drive channel (e.g. for receiving a N−1 scanning signal therefrom).

Such sensors described above may therefore obtain biometric skin contact data.

The three pixel designs described above with reference to FIGS. 2*a* to 2*c* are all shown as circuit diagrams. However, the spatial arrangement of the components within the sensor pixel may be selected based on the display onto which the sensor is to be provided, as will now be described in more detail.

Additionally, the sensor comprises at least some optically transparent components. For instance, one or more components of the sensor pixel 120 may be at least partially optically transparent. In particular, one or more of the electrically conductive components of the sensor are provided by an optically transparent electrically conductive material. In this sense, optical transparency may comprise the material being sufficiently transparent to enable sufficient light from the display to pass through that material to avoid the sensor's presence on the display from substantially adversely affecting the visual quality of the display (e.g. light intensity, colour, sharpness etc.). For example, sufficient optical transparency may comprise enabling the majority of the light incident on the optically transparent material to pass through that material; it may comprise allowing at least 80%, such as at least 90%, such as at least 95%, such as at least 99%, of light to pass through that material. The optically transparent components of the sensor are arranged to enable the sensor to be placed on the display so that light from the display which reaches the eyes of a user watching display will either pass through a gap in the sensor (where no components are present) or through the optically transparent components of the sensor.

The optically transparent components may be provided by any suitable transparent conductors. A transparent conductor may comprise any suitable material with simultaneous high electrical DC conductivity and high transmission of light. For instance, indium tin-oxide may be used to provide a transparent electrically conductive material. Other examples include transparent conducting films (e.g. a thin film of optically transparent and electrically conductive material). Examples of such transparent conducting films include transparent conductive oxides ('TCOs'), conductive polymers, metal grids/random metallic networks, carbon nanotubes, graphene, nanowire meshes and/or ultra-thin metal films. As one particular example, an indium tin oxide-based component (e.g. a component made of indium tin oxide) may be used to provide transparent conduction.

The sensor is arranged to use optically transparent materials for regions/components of the sensor which will overlie an active region 21 of the display (e.g. a display pixel or sub-pixel) when the sensor is installed on the display. The sensor is also arranged so that non (or less) optically transparent components of the sensor will overlie inactive regions 22 of the display when the sensor is installed on the display. For example, the non-transparent materials will only overlie inactive regions 22 of the display.

As described above, the display is formed of a plurality of active regions 21 and inactive regions 22, which are arranged in a repeating pattern across the sensor. The non (or less) optically transparent regions/components of the senor are arranged in a corresponding repeating pattern. In other words, those components of the sensor are arranged in a pattern which is selected based on the repeating pattern for the inactive regions 22 of the display, so that those components will overlie inactive regions of the display when the sensor is installed.

The sensor is arranged so that the components which overlie active regions 21 of the display are optically transparent. The optically transparent components may also overlie inactive regions 22 of the display.

As one example for this configuration, the capacitive sensing electrode 124 of each sensor pixel 120 may be formed of an optically transparent electrically conductive material. For example, the capacitive sensing electrode 124 may be formed of ITO. The transparent capacitive sensing electrode 124 may overlie active regions 21 of the display. To increase sensor area coverage and/or individual capacitive sensing sensitivity, each capacitive sensing electrode 124 may cover as larger area as possible for that sensor pixel 120. For example, the majority of each sensor pixel 120 may be covered by the transparent capacitive sensing electrode 124.

Each sensor pixel 120 will correspond to one sub-region 20 of the display 10. The design of each sensor pixel 120 will therefore be selected based on the spatial arrangement of active regions 21 and inactive regions 22 for the sub-region 20 of the display 10 which that sensor pixel 120 will overlie when the sensor is installed on the display 10. That is, when the sensor is provided on the display 10, each sensor pixel 120 will overlie a corresponding sub-region 20 of the display. In other words, each sensor pixel 120 is arranged with respect to one sub-region 20, so that the non-transparent components of each sensor pixel 120 must overlie the inactive regions 22 of its respective sub-region 20.

In the example of FIG. 1*b*, each sub-region 20 has two active regions 21. The non-transparent components of each sensor pixel 120 will overlie the corresponding inactive region 22 of its respective sub-region 20 of the display 10. The transparent capacitive sensing electrode 124 may overlie one or more active regions 21, as well as the inactive region 22. The transparent capacitive sensing electrode 124 of each sensor pixel 120 may overlie the majority of its respective corresponding sub-region 20 of the display 10. For example, the capacitive sensing electrode 124 may overlie all active regions 21 of the sub-region 20, as well as a majority of the inactive region 22 of the sub-region 20.

The area of each capacitive sensing electrode 124 may be selected based on a desired capacitive response for that electrode 124. For example, where the area of the electrode 124 may be selected based on the thickness of any cover layer separating that electrode 124 from a user interacting with the electrode. The thicker the cover layer, the larger the area of the electrode 124 (e.g. so that the resulting capacitance may exceed a selected threshold in response to proximity to the electrode 124 of the user's skin, such as when a user is touching the cover layer above the electrode 124).

The remaining components of the sensor pixel 120 may be formed of different material to the capacitive sensing electrode 124 (e.g. which is less optically transparent). As such, the remaining components of the sensor pixel 120 are positioned based on inactive regions 22 of the display 10. For the sub-region 20 shown in FIG. 1*b*, that means that the non-transparent components of the sensor pixel 120 will be arranged close to the perimeter of the sub-region 20, or in the central column of the sub-region 20 where the inactive region 22 intersects the active regions 21. For example, the non-optically transparent regions/components of each sensor pixel 120 are arranged to overlie the inactive regions 22 of the display 10 (e.g. they will be arranged themselves in a criss-cross pattern so that they overlie the grid of inactive regions 22 which makes up the criss-cross pattern of inactive regions 22 of the display 10). The non-optically transparent components of each sensor pixel 120 may comprise some or all of: conductors connecting different components, TFTs, or the reference capacitor, as well as read-out and/or gate drive channels.

The read-out and gate-drive channels of the sensor are arranged in a grid-like structure which corresponds to the grid-like structure of the inactive regions 22 of the display array 10 (e.g. so that they will overlie the inactive regions 22 and not impede optical transmission from active regions 21 of the display 10). In other words, the read-out and gate drive channels may be arranged in a criss-cross pattern which is arranged (e.g. sized and shaped) to fit within the criss-cross pattern of inactive regions 22 of the display. In the display of FIG. 1*b*, one sensor pixel 120 corresponds to one sub-region 20 of the display 10. As such, one sensor pixel 120 will cover two active regions 21 (e.g. sub-pixels) of the display, and so the criss-cross pattern of gate drive and read-out channels will overlie some, but not all, of the crisses and/or crosses of the inactive regions 22 of the display 10. That is, in FIG. 1*b*, every other column of inactive region 22 will not have a gate drive channel. Other components of the sensor pixels 120 (e.g. TFTs, reference capacitor, or conductors) may overlie these columns of inactive region 22.

The capacitive sensing electrode 124 is arranged so that at least a portion of it does not overlie an active region 21 of the display 10. That way, the capacitive sensing electrode 124 may be coupled to the remaining components by a (non-transparent) conductor (e.g. so that the region where the transparent capacitive sensing electrode 124 is coupled to the non-transparent conductor will overlie an inactive region 22 of the display 10).

An exemplary arrangement of a sensor pixel 120 installed on a display screen 10 will now be described with reference to FIG. 3.

FIG. 3 shows a sensor pixel 120 having the same underlying circuitry as the sensor pixel 120 of FIG. 2*b*. That sensor pixel is arranged on top of a sub-region 20 from the display 10 of FIG. 1*b*.

FIG. 3 shows a spatial layout for the components of the sensor pixel 120. The sensor pixel 120 is shown in plan. The capacitive sensing electrode 124 is now shown by a thick-lined black square. The capacitive sensing electrode 124 covers the majority of the sensor pixel 120, as well as the majority of the sub-region 20 of the display on which the sensor pixel 120 is provided. As such, the capacitive sensing electrode 124 overlies both active regions 21, and the majority of the inactive region 22 of the sub-region 20. The remaining components of the sensor pixel 120 overlie the inactive region 22.

The first gate drive channel 101 and the first read-out channel 111 are arranged towards the perimeter of the sensor pixel 120 so that they overlie the inactive region 22. At least one of the other components of the sensor is arranged to overlie the central channel of the inactive region 22 which passes between the two active regions 21. As shown, the sense TFT 130 and the select TFT 140 are arranged in this central channel of the inactive region 22. The reference capacitor 122 and the reset TFT 150 are arranged towards the perimeter of the sensor pixel 120 so that they overlie the inactive region 22 around the perimeter of the sub-region 20. The remaining conductors of the sensor pixel 120 all follow paths which overlie the inactive region 22. As such, light output from the active regions 21 will pass through the transparent capacitive sensing electrode 124, but no other components of the sensor pixel.

The sensor pixel 120 is provided by a layered stack of components. The capacitive sensing electrode 124 is provided on a higher layer than the TFTs, reference capacitor 122 or conductors. That way, the capacitive sensing electrode 124 may be closer to the skin of the user touching the display (and there will be fewer components/layers separating the electrode 124 from the skin—the sensor may have a cover on top to protect its components). The remaining components may be provided on lower layers.

For example, the capacitive sensing electrode 124 may be provided on a top metallisation layer of the sensor. For this, the sensor pixel may also include a capacitive sensing electrode connector 126, which may be in the form of a conductive via. The connector 126 is arranged to electrically connect the capacitive sensing electrode 124 to other components of the sensor pixel 120 (e.g. as per the connectivity arrangement shown in the circuit diagram of FIG. 2*b*). The connector 126 may itself be non-transparent. In which case, the connector 126 is arranged to overlie an inactive region 22.

Beneath the top metallisation layer, there may be two or more other layers (e.g. other metallisation layers). The remaining sensor components may span across these layers. For example, the reference capacitor 122 may have one electrode (e.g. plate) on each layer. Likewise, each TFT may span across two layers, such as with its second (gate) region on one layer, and its first and third (drain and source) layers on another layer. For example, the second plate of the reference capacitor 122 and the second region of the sense TFT 130 may be provided on a second layer of the sensor pixel 120. The first plate of the reference capacitor 122 and the first and third regions of the sense TFT 130 may be provided on a first layer of the sensor pixel 120. The select TFT 140 may be distributed across layers in the same way as the sense TFT 150.

While FIG. 3 only shows one sensor pixel 120, it will be appreciated that the capacitive biometric skin contact sensor will be formed of an array of such sensor pixels, each being arranged in a similar manner over the active and inactive regions of the display 10. The individual sensor pixels 120 of the sensor are arranged in a repeating pattern which corresponds to the repeating pattern of the active/inactive regions of the display, so that the sensor may overlie the display with only transparent regions of the sensor overlying active regions of the display.

For example, each sensor pixel 120 of the sensor array may overlie a sub-region 20 of the display having at least one active region 21 and at least one inactive region 22. In this example, each sub-region 20 has two active regions 21 (e.g. two pixels/sub-pixels of the display). For each sensor pixel 120, only its transparent regions/components—in this example, the capacitive sensing electrode 124—overlie active region(s) 21 of the display array 10. A portion of the transparent regions of each sensor pixel 120 will overlie inactive regions 22 of the display (e.g. for electrically connecting them to other components of the sensor). The remaining (non-transparent) components of the sensor only overlie inactive regions 22 of the display. The connection between the capacitive sensing electrode 124 and the conductors connecting that to other components may be over an inactive region 22. All of the gate drive channels, read-out channels, reference capacitors, TFTs and conductors may overlie inactive regions 22. As such, light output from the display will either pass through a region of the sensor where there is no componentry, or it will pass through the optically transparent components of the sensor—in this example, the capacitive sensing electrode 124. A user may therefore view the display in a manner consistent with viewing the display if no sensor were installed on the display, but they may also interact with the display to use the biometric skin contact sensor for obtaining biometric skin contact data for the user.

With the sensor installed on the display 10, to operate the sensor to obtain biometric skin contact data, scanning signals are sequentially applied to each gate drive channel. In response to receiving a scanning signal, each sensor pixel 120 will output a current indicative of a capacitance associated with proximity between the capacitive sensing electrode 124 and a portion of a user's body in proximity to the capacitive sensing electrode 124. This capacitance will vary depending on proximity to the capacitive sensing electrode 124 for the portion of the user's body. By identifying differences in capacitance, a map of the skin on the user's skin in contact with the sensor may be determined. For example, this map may indicate the ridges and valleys of a user's fingerprint/handprint etc., as well as other potential biometric markers such as pores in the skin. This information may be compared to pre-stored information for the user (e.g. to establish if the user contacting the sensor is an authorised user). Each sensor pixel 120 is arranged to provide a capacitive potential divider between at least the capacitive electrode and a second (e.g. gate) region of the sense TFT 130. A current passing through that sense TFT 130 to a read-out channel for that sensor pixel 120 may therefore be based on (e.g. proportional to) the capacitive potential division as brought about by user interaction with the capacitive sensing electrode 124.

With the biometric skin contact sensor installed on the display screen, the sensor may be coupled to a controller associated with the display. As such, the sensor, as installed on a display, may be operable to obtain biometric skin contact data, and to provide this data to the controller. The controller may use this data to authenticate a user attempting to interact with the device having a display on which that sensor is installed. For example, the device and sensor may be arranged so that a user may only control some, or all, operation of the device (and thus the display) after an authorisation process has occurred. For example, the sensor may be coupled to the device so that the controller of the device may receive an indication from the sensor regarding the user interacting with the device. The received indication may be that the user is authorised or unauthorised (e.g. that their obtained biometric data corresponds, or not, to known biometric data). Additionally, or alternatively, the received indication may be in the form of signals from the read-out channels of the sensor which the controller is configured to process to determine whether or not the user should be authorised.

As such, examples of the present disclosure may enable display-bearing devices to be provided with biometric authorisation capability f rom interaction of a user with a sensor installed (seemingly transparently) on the display of the device. This may occur without substantially impeding operation of the display. This may provide increased space efficiency for the device. In other words, a device of a given form factor may have a larger proportion of its area provided by a display while still enabling biometric skin contact data to be obtained (e.g. without requiring a separate region of the device/component to enable biometric data to be obtained).

It is to be appreciated that such a display may form part of any number of devices, such as a mobile phone, a tablet, a computer monitor, a TV etc. The controller associated with that device may comprise processing functionality which controls how that devices functions, e.g. what is displayed on that device, and what functionality that device performs (sending messages etc.).

The exemplary sensor arrangements described above are not to be limiting. It is to be appreciated in the context of the present disclosure that a variety of different pixel designs may be used, and/or that the sensor may be designed for a variety of different display arrays (which have different pixel arrangements). Other suitable arrangements may be provided which enable light from the display to pass through regions of the sensor which have either no componentry or only transparent componentry present.

Each of the exemplary sensors described above enable biometric skin contact data to be obtained by resolving the contours of skin proximal to the sensor, and these sensors may be arranged on a display to enable the display to function as intended while also providing biometric sensing to increase functionality of a device housing that display. It is to be appreciated that the present disclosure may provide assembled devices (e.g. with the sensor installed on the display), as well as standalone sensors which have been designed so that they may subsequently be installed on a display (to provide the desired effects mentioned above). The present disclosure may provide methods of designing such a sensor (e.g. based on the display it is intended to be used with), methods of assembling the sensor on a display, and methods of using a device where a display of the device has such a sensor installed thereon. The present disclosure may provide components which are to be used to provide a finished display with a sensor installed thereon. A number of these different aspects will now be described with reference to FIGS. 4*a* to 4*e*.

FIGS. 4*a* to 4*c* show method steps for providing a display screen with a biometric skin contact sensor thereon to provide the functionality described above. FIGS. 4*d* and 4*e* show end products (i.e. display screens with biometric skin contact sensors installed thereon).

For each of FIGS. 4*a* to 4*e*, a display 401 is shown as the bottommost layer. Other components are then installed on top of the display 401. For each of FIGS. 4*a* to 4*e*, a top layer is provided to protect the components underneath it (e.g. sensor/display 401).

It is to be appreciated that a capacitive biometric skin contact sensor of the present disclosure may be provided over multiple layers. For example, agate region of a TFT of the sensor may be provided in a different layer to source and drain regions of that TFT. The capacitive sensing electrode may be provided on a separate (e.g. upper) layer. To illustrate there being different layers, in FIGS. 4*a* to 4*e*, the sensor is shown over two layers: a display facing layer 403 and a user facing layer 404 (although it will be appreciated that this is just to illustrate the principle, and that further layers may be provided). The display facing layer 403 may comprise parts of the one or more TFTs and/or one or more electrodes of a reference capacitor. The user facing layer 404 may comprise the capacitive sensing electrode. A protective layer is provided on the user facing side of the user facing layer 404 of the sensor (e.g. on top of the sensor so that the protective layer will be between the sensor and the user). As described in more detail below, in FIGS. 4*a* to 4*e*, each figure includes at least one of a first protective layer 402 and a second protective layer 405.

FIGS. 4*a* to 4*c* show different examples for providing a biometric skin contact sensor on a display 401. In each of these FIGS., a cover glass is provided for installation. The cover glass is arranged to provide a means for installing the sensor onto the display screen so that the sensor may be arranged in the manner described above (e.g. to enable transparency to the display screen while also enabling biometric skin contact data to be obtained). The cover glass may also provide structural integrity and/or protection to the sensor, and it may also provide protection to the display screen. The cover glass may be arranged so that, once installed on the display 401, the cover glass can protect the display 401 and the sensor installed on the display 401 (e.g. from damage due to impact with the user-facing side of the assembled device).

The cover glass includes a substrate and a capacitive biometric skin contact sensor (of the type described above). To provide the cover glass, the sensor may be built onto the substrate. In some examples (e.g. as shown in FIGS. 4*a* and 4*c*), this substrate will be arranged on a user-facing side of the sensor, once the cover glass is installed on the display. In other examples (e.g. as shown in FIG. 4*b*), the sensor will be arranged on a user-facing side of the substrate when installed on the display. Where the sensor is arranged on the user-facing side of the substrate, an additional protective layer may be provided on the user-facing side of the sensor. For example, the cover glass may be arranged to enable the substrate to overlie the display screen for protecting the display screen and/or to overlie the sensor for protecting the sensor. The substrate has a display-facing surface and a user-facing surface. The sensor may be built on either face of the surface. Alternatively, the sensor may be built on a surface of another component prior to attachment to the substrate. Building the sensor may comprise providing (e.g. depositing) a first conductive layer on a display-facing surface to provide the capacitive sensing electrode (e.g. for each sensor pixel).

A cover glass may be designed to protect the entire display onto which it is to be installed. For example, the cover glass may be sized and shaped according to the form factor for the device having the display 401 onto which the cover glass is to be installed. For example, where the device is a mobile phone, the cover glass may be sized based on the mobile phone screen (e.g. so that it covers the entire screen). The cover glass may be arranged so that when installed on a device, that device would look similar to how it would look if no sensor had been installed on its display 401 (apart from the additional layers/thickness when viewed in cross-section). The cover glass may provide an exterior surface of the device (which overlies the display screen of the device).

The display screen for each device will have a known arrangement of active and inactive regions (e.g. pixels/subpixels). That is, the size and location of each active region on the display 401 will be known. Typically, the active regions will be arranged in a repeating pattern in which they are separated f rom each other by inactive regions. The repeating pattern will span across the majority of the display 401 (e.g. it may span across the entire display 401). Often, the display 401 may take up a majority of the user-facing side of the device. The cover glass may be arranged to cover the entirety of the display screen. It may be arranged to cover the majority (or the entirety) of the user-facing side of the device itself. As described above, the design for the sensor (e.g. arrangement of transparent and non-transparent regions of the sensor) will be selected to correspond to the arrangement of active and inactive regions of the display 401. As such, once the sensor is installed on the display 401, the display 401 will be operable to function as intended, while biometric data may also be obtained using the sensor on the display 401.

The cover glass (including the sensor) may be designed so that when the cover glass is installed correctly on the display 401, the intended arrangement for the sensor overlying the display 401 is provided. In other words, by correctly arranging the cover glass on the display 401 of the device (e.g. on the user facing surface of the device), the transparent and non-transparent regions of the sensor will be respectively aligned with the active and inactive regions of the display 401. For example, there may be a known spatial relationship describing the offset of the active regions of the display 401 from other landmarks on the display 401, such as the edges of the display 401 or device etc. The cover glass may therefore be aligned with such landmarks, so as to provide the cover glass on the display 401 with the sensor in the correct location.

To further aid this process, one or more reference features 601, 602 (FIG. 4*a*, schematic) may be used. Reference features may be used to facilitate several aspects of the installation process. Firstly, reference features 601, 602 may be used when providing the sensor on the substrate (to provide the cover glass). For example, the substrate may be of a selected size and shape so that it will fit the display screen (401) (e.g. in a selected way). The sensor may therefore be provided in a selected arrangement relative to the substrate (so that when installed on the display, the sensor is in the correct arrangement relative to the active/inactive regions of the display). Secondly, reference features 601, 602 may be used when providing the cover glass onto the display (so that it is correctly installed on the display).

For example, one or more reference features (e.g. alignment markers) may be provided to facilitate providing the sensor on the substrate in the correct arrangement (alignment). This may comprise one or more reference features (alignment markers) being provided on the substrate against which the sensor may be aligned (e.g. when providing the sensor on the substrate). The sensor itself may comprise one or more corresponding reference features to align with the reference features of the substrate. Additionally, or alternatively, properties of the structural arrangement of the sensor may provide a reference feature (e.g. which may be aligned with a reference feature on the substrate). For example, the read-out channels and gate drive channels of the sensor will be arranged in a grid-like structure. This grid-like structure (e.g. edges thereof) may be used when aligning the sensor on the substrate (e.g. the grid-like structure itself may effectively form a reference feature of the sensor which may then be aligned with the substrate to ensure the correct alignment is provided). For example, this may comprise aligning the edge of the grid-like structure with a fixed spatial offset to an edge of the cover glass.

As another example, the reference features may comprise some form of corresponding indicia which are designed to overlap with each other in a known manner when installed correctly. Such indicia may comprise one or more markings on e.g. the substrate, the sensor and/or the display screen, wherein the markings are designed to have a known appearance if overlapped correctly (e.g. in response to correct alignment). Examples of this include a circle arranged to fit with in an annulus, two crosses designed to overlap centrally and/or across inside a circle. Another example includes a cross on one component and four rectangles on another component. If overlaid correctly, the four rectangles will align with the cross so that the four rectangles are separated from each other by the cross. Such reference features may be provided to enable the sensor to be installed in a correct arrangement on the substrate (e.g. reference features on at least one of the sensor and substrate). Such reference features may be provided to enable the assembled cover glass (substrate and sensor) to be installed in a correct arrangement on the display 401. For example, the reference features may be provided on the cover glass (as part of the sensor and/or on the substrate) and/or on the display screen onto which the cover glass is to be installed.

The reference features may be arranged so that when the alignment is set according to the reference features (e.g. when one component is installed on the other component so that their respective reference features are aligned as intended), the sensor is aligned (or will be aligned once the cover glass is installed) with reference to active and inactive regions of the display 401 as per the arrangement described above. For example, when the cover glass is installed on the display screen with one or more reference features of the cover glass aligned correctly with one or more corresponding reference features of the display screen, the sensor will also be correctly aligned with the display screen. For example, the substrate may comprise one or more reference features against which the sensor may be aligned on the substrate and also which may be used to then align the cover glass (substrate with sensor) on the display screen.

As described above, the cover glass may comprise the sensor and a substrate, and is configured for installation onto a display 401 in the correct alignment for the sensor and display 401 to function as intended. Different exemplary arrangements for such a cover glass will now be described with reference to FIGS. 4*a* to 4*c*.

In FIG. 4*a*, the sensor is arranged on a display-facing surface of the first protective layer 402. As such, once the cover glass is installed on the display, the first protective layer 402 will form a protective substrate separating the sensor from the user. The sensor may either built directly onto the display-facing surface of the first protective layer 402, or the sensor may be built elsewhere, and then that sensor attached to (e.g. laminated on to) the display-facing surface of the first protective layer 402.

Where the sensor is built directly onto the display-facing surface of the first protective layer 402, the sensor may be built in a reversed stack configuration. For this, a series of conductive regions are provided (e.g. deposited) onto the display-facing surface of the first protective layer 402 to provide the capacitive sensing electrodes of the sensor. The remainder of the sensor may then be built on and/or around these components. As shown, this includes providing more layers to the sensor, so that the sensor spans at least two layers from the user-facing layer to the display-facing layer. Where the sensor is built elsewhere then attached to the display-facing surface of the first protective layer 402, the sensor may be built in any suitable order (e.g. the most display-facing layer may be built first, with others then built on top of it).

The cover glass shown in FIG. 4*a* is formed of a first protective layer 402 with the sensor arranged on the display-side of that protective layer (with the capacitive sensing electrodes of the sensor on the user-facing side of the sensor—e.g. only separated from the user by the first protective layer 402). This cover glass may then be installed on the display screen. Such installation may comprise laminating the cover glass onto the display 401, or affixing in some other means, such as using adhesive etc.

In FIG. 4*b*, the sensor is arranged on a user-facing surface of the first protective layer 402. A second protective layer 405 is also provided on a user-facing surface 404 of the sensor. The cover glass of FIG. 4*b* thus includes a sensor sandwiched between two protective layers. In this arrangement, it is the display-facing layer 403 of the sensor which is adjacent to the first protective layer 402 (the user-facing side of the first protective layer 402), and the user-facing layer 404 of the sensor will be closer to the user. The second protective layer 405 is provided to protect the sensor. The first protective layer 402 may provide protection to the display 401. The first protective layer 402 may provide a uniform and consistent surface on which to build the sensor.

The cover glass shown in FIG. 4*b* could be built in several ways. The sensor could be built onto either protective layer. The other protective layer may then be applied to the sensor (e.g. deposited on top of it), or the combined sensor and protective layer may then be coupled to the other protective layer (e.g. laminated on to that other protective layer). For example, when coupling different components of the cover glass to each other, an optically coupled adhesive may be used.

For example, the sensor could be built on to the first protective layer 402. This may comprise first building the display-facing layer of the sensor on the using-facing surface of the first protective layer 402. The display-facing layer 403 of the sensor may include a portion of one or more of the TFTs, an electrode of the reference capacitor, and/or some of the conductors of the sensor circuitry. Subsequent sensor layers may then be built on top of the display-facing layer 403. A final user-facing layer 404 may then be built to provide the top of the sensor (e.g. containing the capacitive sensing electrodes). This assembled sensor and first protective layer 402 may then be coupled with the second protective layer 405. For example, the second protective layer 405 may then be attached on top (on the user-facing side) of the sensor—e.g. by laminating the second protective layer 405 onto the sensor. Providing the second protective layer 405 on the user-facing surface 404 of the sensor may be performed before or after the first protective layer 402 and sensor have been installed on the display screen. In other words, the sensor installed on the user-facing surface of the first protective layer 402 may form the cover glass, or the sensor installed on the user-facing surface of the first protective layer 402 with the second protective layer 405 installed thereon may form the cover glass.

As another example, the sensor could be built on to the display facing-surface of the second protective layer 405. This may be performed as described above in relation to FIG. 4*a* (e.g. to provide the sensor in a reverse stack configuration). This assembled sensor and second protective layer 405 may then be installed on (e.g. laminated onto) the first protective layer 402. This assembled sensor and second protective layer 405 may be installed onto the first protective layer 402 to form the cover glass, and then that cover glass may be installed onto the display screen. Alternatively, the first protective layer 402 may be installed onto the display screen 401 before the sensor is installed thereon. In which case, the assembled sensor and second protective layer 405 will form the cover glass, and then that cover glass will be installed on the display-facing surface of the first protective layer 402 (as installed on the display 401).

As such, the cover glass of FIG. 4*b* may comprise one of: (i) a sensor sandwiched between two protective layers, (ii) a sensor on a display-facing surface of a protective layer, and (iii) a sensor on a user-facing surface of a protective layer. That cover glass may then be installed onto the display 401 so that a display-facing surface of the first protective layer 402 is coupled to the display 401, and so that a user-facing surface 404 of the sensor is protected by a second protective layer 405. The sensor may have been originally built onto either of the protective layers. The cover glass will have a protective layer (first protective layer 402) for protecting the display 401 and/or the underside of the sensor, and a protective layer (second protective layer 405) for protecting the sensor from the user.

FIG. 4*c* shows an arrangement similar to that of FIGS. 4*a* and 4*b*. The sensor is built onto a display-facing surface of second protective layer 405. This may be in the same manner as described above in relation to FIG. 4*a* except that it is a second protective layer 405, and the display 401 has its own first protective layer 402. In a similar manner to one of the examples described above in relation to FIG. 4*b*, the cover glass (sensor on display-facing side of second protective layer 405) may then be installed directly onto the first protective layer 402 (as already installed on the display 401).

The protective requirements for the display 401 and the sensor may be different. As such, a protective layer which is included to protect the display 401 may be designed to provide different levels of protection as compared to a protective layer which is included to protect the sensor. Alternatively, the protective layers may have similar properties. The two protective layers may combine to protect the display 401, and so they may be selected so that the total protection is sufficient. The protective layer separating the sensor from the user may be selected to enable a threshold capacitance to be achieved by a user's skin contacting the user-facing surface of that protective layer. For example, the thickness and/or dielectric constant of that protective layer may be selected so that the resulting capacitance is above a threshold value.

For each of the examples shown, the most user-facing layer (i.e. the uppermost/outermost layer—first protective layer 402 in FIG. 4*a* and second protective layer 405 in FIGS. 4*b* and 4*c*) is provided by an optically transparent material. The most user-facing layer may be arranged to provide a selected amount of optical transmission. For example, the most user-facing layer may be formed of glass or any other suitable material. The most user-facing layer may be arranged to enable a selected amount of sensitivity to be provided for any capacitance between the capacitive sensing electrodes of the sensor and the conducting body of the user in proximity to the most user-facing layer. For example, the most user-facing layer may have a thickness of less than 100 microns, such as less than 75 microns, such as less than 60 microns, such as less than 50 microns. For example, the most user-facing layer may be provided by glass having a thickness of under 50 microns (e.g. under 40 microns, or under 35 microns, or under 30 microns, or under 25 microns, or under 20 microns). For example, the thickness may be in the range of 10 to 30 microns, such as 10 to 20 microns.

In examples mentioned above, the sensor may be built onto a substrate (e.g. a protective layer) to form a cover glass (whether being built on a user-facing or display-facing surface of that substrate). The cover glass may be configured for installation onto a selected display 401. For example, it may be a cover glass for a mobile phone, and the dimensions of the cover glass are selected to correspond to those required for covering the display 401 on the phone. With the sensor disposed on a substrate, a protective layer may then be provided on a user-facing surface of the sensor for protection. For example, with reference to FIG. 4*b*, the sensor (user-facing layer 404 and display-facing layer 403) may be provided on the first protective layer 402 (as a substrate), and then the second protective layer 405 may then be applied to the user-facing side 404 of the sensor for protection. This arrangement of a sensor built on a substrate with a protective coating on a user-facing side of the sensor may provide a cover glass (e.g. which may then subsequently be installed on the intended display screen).

The protective layer for the sensor (the most user-facing layer) may be applied onto the sensor as a foil or it may be laminated onto the sensor (e.g. for a glass cover layer). For example, the protective layer may be laminated onto the sensor (on to the user-facing side of the sensor). The protective layer may be laminated on to the sensor to provide a hard coating for the sensor. The protective layer, once applied, may form a thin laminate which protects the sensor. For example, this protective layer may be a thin substrate (e.g. glass under 50 microns in thickness, under 30 microns etc., or it may be applied as a covering foil and/or inorganic coating).

To affix the protective layer onto the sensor, an optically coupled adhesive may be used. The adhesive may be coupled to the display 401 such that it is effectively transparent to light output from the display 401. The adhesive applied may have a thickness of less than 10 microns, e.g. less than 5 microns, e.g. less than 4 microns. For example, the adhesive may have a thickness of about 3 microns.

Examples of the present disclosure may provide a multi-layer optically transparent cover glass. For this, a biometric skin contact sensor is provided on an optically transparent substrate. The sensor may either be built directly onto the optically transparent substrate or the sensor may be built elsewhere and then subsequently installed onto the sensor. An optically coupled adhesive may be used to couple the sensor to the optically transparent cover glass (if adhesive is needed for this). In one example, a layer of optically coupled adhesive may be coupled to the other side of the sensor to the substrate for installation of the sensor and the substrate onto another component (such as another protective substrate or a display). In another example, a second optically transparent substrate may be provided on the other side of the sensor to the first optically transparent substrate. The second optically transparent substrate may be coupled to the sensor using an optically couple adhesive. The multi-layer optically transparent cover glass may comprise the sensor coupled to one or both optically transparent substrates. The resulting cover glass may be coupled to a display using an optically coupled adhesive.

For example, an optically transparent substrate may be provided as a base layer. A biometric skin contact sensor may be provided on a user-facing side of the optically transparent substrate. A layer of optically coupled adhesive is provided on a user-facing side of the sensor. A transparent protective layer is provided on top of the optically coupled adhesive. The resulting stack may provide a multi-layer optically transparent cover glass capable of providing biometric skin contact sensing. For example, this resulting stack may be similar to the stack of FIG. 4*b* when the sensor 403, 404 is installed on the first protective layer 402 and the second protective layer 405 is installed on the sensor.

As another example, a biometric skin contact sensor may be provided on a display-facing side of an optically transparent substrate. The sensor may be built directly onto the substrate, or it may be installed on the substrate using an optically coupled adhesive. A layer of optically coupled adhesive may be provided on the display-facing side of the sensor (for installing the sensor on another optically transparent substrate or onto the display).

In the examples described above, the optically transparent substrate may be made of glass. The glass substrate may have a thickness of 300 microns (e.g. where that substrate forms a protective layer for the display screen, such as for first protective layer 402 in FIGS. 4*b* and 4*c*). As an alternative, a suitable polymer may be used, such as polyimide. A polyimide substrate may have a thickness of 20 microns. The optically coupled adhesive may have a thickness of 3 microns. The transparent protective layer may be made of glass. For example, the glass protective layer may have a thickness of 30 microns (e.g. between 25 and 50). The glass protective layer may be even thinner, such as under 20 microns. Such a multi-layer optically transparent cover glass may be designed for coupling to a particular device (with a particular display 401). For example, the sensor may be arranged as described above so that, when installed on the device/display 401, the sensor overlies the active/inactive regions of the display 401 to enable the display 401 to function as intended and biometric skin contact data to be obtained using the sensor. The assembled cover glass may include one or more reference features (e.g. on the optically transparent substrate), which are configured to facilitate correct alignment of the cover glass onto the display screen (by cooperating with corresponding reference features on the display screen).

Different examples for cover glasses have been described above, e.g. with reference to FIGS. 4*a* to 4*c*. Such cover glasses are designed to interact with a particular display screen so that the sensor of the cover glass aligns with the display 401 to provide transparent biometric skin contact sensing on the display 401. Reference will now be made to FIGS. 4*d* and 4*e* which illustrate cross-sectional views of sensors assembled on display screens. It is to be appreciated in the context of the present disclosure that these assembled devices may be formed by providing a cover glass and installing the cover glass onto the display 401, or they may be formed in another way. For example, the assembled devices may be formed by building up from the display 401—e.g. by building a sensor directly onto a display screen, or onto a protective substrate coupled to a user-facing surface of the display screen (with a protective layer then being applied onto a user-facing surface of the sensor). In other words, the assembled devices of FIGS. 4*d* and 4*e* could potentially have been provided without using a cover glass per se. to manufacture those assembled devices.

FIG. 4*d* shows an assembled device having a display 401 with a sensor installed thereon. The device of FIG. 4*d* could be provided by installing the cover glass of FIG. 4*a* onto the display 401. Alternatively, it could be provided by building the sensor and then protective layer in situ on the display 401. The resulting device of FIG. 4*d* has a sensor provided on a user-facing surface of the display 401. The display-facing surface 403 of the sensor is adjacent to the display. A protective layer (402/405) is provided on a user-facing surface 404 of the sensor. The user-facing surface 404 of the sensor is adjacent to a display-facing surface of the protective layer 402/405. Although not shown, the display-facing side 403 of the sensor may be coupled to the display 401 via an optically coupled adhesive layer and/or the user-facing side 404 of the sensor may be coupled to the protective layer 402/405 via an optically coupled adhesive layer.

FIG. 4*e* shows an assembled device having a display 401 with a sensor installed thereon. FIG. 4*e* is similar to FIG. 4*d*, except that it includes two protective layers: a first protective layer 402 arranged between the display 401 and the display-facing side 403 of the sensor, and a second protective layer 405 arranged on a user-facing side of the user-facing side 404 of the sensor. Although not shown, the display-facing side 403 of the sensor may be coupled to the first protective layer 402 via an optically coupled adhesive layer, and/or the user-facing side 404 of the sensor may be coupled to the second protective layer 405 via an optically coupled adhesive layer, and/or the first protective layer 402 may be coupled to the display 401 via an optically coupled adhesive layer.

The device of FIG. 4*e* may be provided in a number of different ways. Firstly, a cover glass may be provided which is formed of the first protective layer 402, the sensor 403, 404, and the second protective layer 405 (e.g. as described above in relation to FIG. 4*b*). This cover glass may then be installed onto the display 401. Secondly, a cover glass may be provided which is formed of the first protective layer 402 and the sensor 403, 404 (e.g. as described above in relation to FIG. 4*b*). This cover glass may then be installed onto the display 401. The second protective layer 405 may then subsequently be installed onto the user-facing side 404 of the sensor, as installed on the display 401. Thirdly, the first protective layer 402 may be provided on the display 401 (it may be installed on the display 401, or the display 401 may be originally provided with said first protective layer 402 thereon). A cover glass may be provided which is formed of the sensor 403, 404, and the second protective layer 405 (e.g. as described above in relation to FIGS. 4*b* and 4*c*). This cover glass may then be installed onto a user-facing side of the first protective layer 402, as installed on the display screen. Finally, the first protective layer 402 may be provided on the display 401 (it may be installed on the display 401, or the display 401 may be originally provided with said first protective layer 402 thereon). The sensor may then be built up on the first protective layer 402 (starting with the display-facing side 403 then up to the user-facing side 404). The second protective layer 405 may then be provided on the user-facing side 404 of the sensor.

Examples described herein may utilise one or more protective layers. Each protective layer may be provided by a transparent substrate. The transparent substrate may comprise glass. The glass may have a hardness of 6H or more, e.g. 7H or more, e.g. 8H or more, e.g. 9H or more (with reference to the Mohs scale). The glass may be chemically tempered. For example, either or both of the first and second protective layers may be provided by a layer of 9H tempered glass, e.g. at a thickness of under 50 microns, e.g. about 10-35 microns (e.g. at 30 or less microns, e.g. 10-30 microns, e.g. 10-20 microns).

Once a biometric sensor is installed on the display of the device, the biometric sensor may be coupled to a control unit of the device. The control unit may then receive signals f rom the biometric sensor, and may control operation of the device based on data obtained from the biometric sensor. The sensor may include conversion circuitry, such as an analogue-to-digital converter ('ADC') for converting received electrical signals into a digital signal. For example, the sensor may comprise integration circuitry to integrate read-out signals (e.g. read-out signals, such as voltages or currents) to obtain an indication of proximity of a conductive body to the capacitive sensing electrodes of the sensor array. Such data indicating this proximity may be used to provide biometric sensing (e.g. to identify a user based on ridges and valleys of their skin). This biometric data may be used to provide authorisation to a user of the device. For example, some functionality of the device may be inhibited until a user of the device has been authorised. Data obtained from the biometric sensor may be used to provide such authorisation. As another example, the biometric sensor could be used to indicate contact location data for a screen of the device (e.g. to indicate a location on the screen which the user has contacted/is in contact with. In some examples, the sensor may be configured to operate first in a lower power (lower resolution and/or sensitivity) mode in which the sensor is operated to obtain an indication of contact location, then to operate in a higher power (higher resolution and/or sensitivity) mode in a region in which contact is detected.

Cover glasses of the present disclosure may be designed to interact with a particular display/device. Such a cover glass may be arranged (sized and shaped) so that it may be affixed onto the device to cover the display. It is to be appreciated in the context of the present disclosure that the particular type of device or display need not be considered limiting. Examples of suitable devices may include any device which has a display screen on it, such as a mobile phone, a tablet, a computer/laptop, a TV, a camera etc. Likewise, the particular type of display should not be considered limiting. Any suitable display having active and inactive regions may be used. For example, any display having pixels or sub-pixels which output light, and which are separated f rom each other by inactive (non-light-outputting) regions may be used. Examples for this include LCD, OLED, AMOLED technology etc.

In examples described above, protective layers are provided such as the first and second protective layers. However, it will also be appreciated that such layers may be provided for additional or alternative reasons. For example, the substrate onto which the sensor is provided/built may provide a flat and consistent surface for the sensor. For example, a first or second protective layer, as relevant, and as described herein may be used to provide a suitable surface onto which the sensor is to be provided (rather than being provided to protect the display per se). For example, the layer may provide a flat substrate with a low surface roughness to facilitate installation of the sensor (e.g. flatter and less rough than a display screen). Protective layers described herein may be configured to provide protection against dust and/or moisture (e.g. as per IP65), to provide hardness for scratch protection (e.g. 6H hardness or more, such as up to 9H hardness), and/or to provide any relevant filters, such as a UV filter.

In the examples described herein, there has been a mapping of one sensor pixel to one sub-region 20 of the display, where that sub-region 20 includes two active regions. However, it will be appreciated that this arrangement is not intended to be limiting, and the particular ratio of number of active regions to number of sensor pixels may vary depending on the display. For example, in some arrangements, there may be more sensor pixels than active regions of the display, and the opposite may also be true. The distribution of sensor pixels across the display may be selected to ensure there is a sufficiently high spatial density of capacitive sensing electrodes to obtain suitable biometric data from skin interacting with the sensor. The precise arrangement of these capacitive sensing electrodes and other sensor circuitry may then be tailored to fit to the arrangement of active and inactive regions of the display. It will be appreciated that active regions may be pixels, or they may be sub-pixels (or a combination of multiple pixels/multiple sub-pixels).

Examples of the present disclosure may enable a sensor to be provided on a display so that biometric data may be obtained using the sensor while the sensor appears transparent to the display. It is to be appreciated in the context of the present disclosure that the sensor appearing transparent does not require 100% optical transparency. For example, appearing optically transparent may comprise having optical transparency of 80% or more, e.g. 90% or more, e.g. 95% or more, e.g. 97% or more e.g. 99% or more. For example, the sensor may be arranged to provide a greater amount of optical transparency for some active regions of the display than for others. For this, the sensor may be arranged to have less material separating those regions of the display from the user. The sensor may be arranged to prioritize optical transparency to one colour of light. For example, this may be to prioritize transmission of blue light.

In examples described herein, the optical transparency may be provided through use of optically transparent capacitive sensing electrodes arranged over the active regions, with all other parts of the sensor being non-transparent parts and arranged over inactive regions. Variations to this arrangement may be provided. For example, other components of the sensor may be formed of optically transparent materials (e.g. the conductors such as gate drive and/or read-out channels and/or other conductive material, or reference capacitors). Likewise, it is to be appreciated that the entirety of the capacitive sensing electrode need not be transparent—e.g. regions not overlying active regions of the display may not be transparent. It is also to be appreciated in the context of the present disclosure that the sensor need not perfectly overlap the display so that no non-transparent material overlies an active region. For example, there may be a small amount of overlap by non-transparent material (e.g. across corners of the active regions) while still enabling sufficient transparency to be provided.

As described herein, to provide optical transparency to components of the sensor pixels, an optically transparent electrical conductor may be used, such as indium tin oxide. This may be used to provide any of the relevant electrically conducting components as transparent (e.g. the capacitive sensing electrode, conductors of the sensor, electrodes of the capacitor). Other transparent materials could also be used, such as to use transparent semi-conductor material, e.g. indium gallium zinc oxide ('IGZO'), and/or to use transparent insulator layer(s) through use of e.g. inorganic silicon nitride ('SiNx'), silicon dioxide ('SiO2') or organic polymers such as organic polyimide. Capacitive sensing electrodes may be provided by an optically transparent material so that the surface area of the display they cover is greater (e.g. so that they can overlie active regions of the display). This may facilitate greater sensing sensitivity (because each electrode may produce larger capacitance swings). The capacitive sensing electrodes may cover a majority of each sensor pixel/sub-region of the display (e.g. more than 50%, e.g. more than 60%, e.g. more than 70%, e.g. more than 80%, e.g. more than 90%, e.g. more than 95%).

A number of exemplary pixel designs have been described above. However, it is to be appreciated that these are not to be considered limiting—other pixel designs could be used. For example, where TFTs have been used, these could be provided by suitable alternative components, e.g. other types of transistors. Likewise, although reference capacitors have been described, these may be optional. Exemplary pixel structures may include one or more TFTs. A first (e.g. sense) TFT may be included so that the read-out current from that pixel has a value proportional to capacitance associated with the reference capacitor. A second (e.g. select) TFT may be included to select whether the first TFT can output a read-out current (e.g. to control current supplied to that first TFT). A third (e.g. reset) TFT may be included to reset the pixel circuit to a reference value. A fourth (e.g. bias) TFT may be included to ensure the pixel is charged up to a reference value.

Additionally, or alternatively, capacitive sensing electrodes may not be provided in an upper layer of the sensor and/or they may not take up the majority of the area of the sensor pixel. For example, they may be provided in the same layer as one or more other components of the sensor pixel, and so may take up less space on the display. For example, they may only cover certain active regions of the display. Such active regions may be selected based on a property of those active regions, such as their size, brightness or colour—the capacitive sensing electrode may be designed to overlie bigger and/or brighter active regions of the display. As another example, capacitive sensing electrodes may not overlie blue light regions of the display (or they may overlie those regions less than they do for other colour regions).

It will be appreciated from the discussion above that the examples shown in the figures are merely exemplary, and include features which may be generalised, removed or replaced as described herein and as set out in the claims. As will be appreciated by the skilled reader in the context of the present disclosure, each of the examples described herein may be implemented in a variety of different ways. Any feature of any aspects of the disclosure may be combined with any of the other aspects of the disclosure. For example, method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the examples in which it is described, or with any of the other features or combination of features of any of the other examples described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Other examples and variations of the disclosure will be apparent to the skilled addressee in the context of the present disclosure.

The invention claimed is:

1. A cover glass configured to overlie a display screen of a user equipment, UE, device, the cover glass comprising:

a substrate arranged to overlie a display screen for protecting said display screen, wherein the substrate has a display-facing surface and a user-facing surface; and a capacitive biometric skin contact sensor coupled to the substrate and configured to resolve the contours of skin proximal to the sensor, the sensor comprising:

a plurality of gate drive channels;

a plurality of read-out channels;

a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom;

wherein the cover glass is arranged to couple to said UE device to enable transmission of biometric skin contact data from the conversion circuitry to a processor of said UE device, wherein the substrate comprises one or more reference features arranged to enable a selected alignment to be provided between the cover glass and said display screen of said UE device, wherein the sensor array of sensor pixels of the biometric skin contact sensor is arranged at a selected offset from said one or more reference features, wherein a tolerance for the selected offset of the sensor array from the one or more reference features is less than a pixel pitch for the sensor pixels of the sensor array.

2. The cover glass of claim 1, wherein the skin contact sensor is arranged on the user-facing surface of the substrate; and wherein the skin contact sensor comprises a cover layer configured to be touched by a user of said UE device, the cover layer overlying a user-facing side of the skin contact sensor.

3. The cover glass of claim 2, wherein each sensor pixel has a plurality of layers comprising a first conductive layer deposited on a display-facing surface of the cover layer and arranged to provide the capacitive sensing electrode of the sensor pixel.

4. The cover glass of claim 1, wherein the skin contact sensor is laminated onto the substrate or built directly onto the substrate.

5. The cover glass of claim 1, wherein the skin contact sensor is arranged on the display-facing surface of the substrate, and wherein each sensor pixel has a plurality of layers comprising a first conductive layer deposited on the display-facing surface of the substrate and arranged to provide the capacitive sensing electrode of the sensor pixel.

6. The cover glass of claim 1, wherein the one or more reference features comprise at least one of: (i) one or more edges of the substrate, and (ii) one or more reference indicia provided on the substrate.

7. The cover glass of claim 1, wherein the skin contact sensor is coupled to the substrate and aligned relative to the one or more reference features.

8. The cover glass of claim 7, wherein the cover glass is arranged to provide a second selected offset between the skin contact sensor and the one or more reference features.

9. The cover glass of claim 7, wherein a pattern for the gate drive channels or the read-out channels is arranged to have a second selected offset relative the one or more reference features.

10. The cover glass of claim 1, wherein the skin contact sensor comprises one or more reference features, and wherein the skin contact sensor is coupled to the substrate with the reference features of the skin contact sensor aligned relative to the reference features of the substrate.

11. The cover glass of claim 1, wherein said display screen of said UE device comprises a display array having:

a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions;

wherein the skin contact sensor is arranged with its non-transparent components in a second grid-like structure; and wherein the second grid like structure is selected to match the first grid-like structure to enable the cover glass to be installed on said display screen so that light output from said active regions of said display array passes through the sensor.

12. The cover glass of claim 11, wherein at least some of the capacitive sensing electrodes of the sensor array are arranged to overlie at least some of the active regions of the display array when the cover glass is installed on the display screen so that light output from said active regions passes through said at least partially transparent capacitive sensing electrodes.

13. The cover glass of claim 1, wherein each capacitive sensing electrode is provided in a user-facing layer of its sensor pixel.

14. The cover glass of claim 1, wherein the capacitive sensing electrode of each sensing pixel covers the majority of the area of the sensor pixel.

15. The cover glass of claim 1, wherein the sensor array of sensor pixels covers a majority of the substrate.

16. The cover glass of claim 1, wherein:

the substrate is optically transparent;

the cover glass further comprises an optically transparent cover layer provided on the capacitive biometric skin contact sensor on the opposite side to the optically transparent substrate; and wherein the optically transparent cover layer is attached to the capacitive biometric skin contact sensor via an optically coupled adhesive layer.

17. A user equipment, UE, device comprising:

a display screen;

a processor; and a cover glass comprising a substrate and a capacitive biometric skin contact sensor coupled to the substrate and configured to resolve the contours of skin proximal to the sensor;

wherein the cover glass overlies the display screen for protection thereof; and wherein the capacitive biometric skin contact sensor comprises:

a plurality of gate drive channels;

a plurality of read-out channels;

a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom, and to transmit biometric skin contact data to the processor, wherein the substrate comprises one or more reference features arranged in a selected alignment between the cover glass and the display screen, wherein the sensor array of sensor pixels of the biometric skin contact sensor is arranged at a selected offset from said one or more reference features, wherein a tolerance for the selected offset of the sensor array from the one or more reference features is less than a pixel pitch for the sensor pixels of the sensor array.

18. The UE device of claim 17, wherein the display screen comprises a display array having:

a plurality of active regions comprising display pixels and/or display subpixels, wherein the active regions are distributed across the display array according to a first repeating pattern; and a plurality of inactive regions, wherein the inactive regions are arranged in a first grid-like structure so that the active regions are separated from each other by the inactive regions;

wherein the skin contact sensor is arranged with its non-transparent components in a second grid-like structure; and wherein the second grid like structure matches the first grid-like structure to enable light output from active regions of the display array to pass through the sensor.

19. A capacitive biometric skin contact sensor configured to resolve the contours of skin proximal to the sensor and arranged to be coupled to a substrate to provide a cover glass, wherein said substrate is arranged to overlie a display screen of a user equipment, UE, device for protecting said display screen, and wherein said display screen comprises a display array having: (i) a plurality of active regions comprising display pixels and/or display subpixels, wherein the active regions are distributed across the display array according to a first repeating pattern; and (ii) a plurality of inactive regions, wherein the inactive regions are arranged in a first grid-like structure so that the active regions are separated from each other by the inactive regions, the skin contact sensor comprising:

a plurality of gate drive channels;

a plurality of read-out channels;

a sensor array of sensor pixels, wherein each sensor pixel comprises a thin film transistor and an at least partially transparent capacitive sensing electrode coupled to the thin film transistor, and wherein each of the sensor pixels is coupled to both: (i) a gate drive channel to receive a scanning signal; and (ii) a read-out channel to provide a read-out signal; and conversion circuitry configured to process read-out signals received from sensor pixels to obtain biometric skin contact data therefrom and to transmit biometric skin contact data to a processor of said UE device;

wherein the skin contact sensor is arranged with the non-transparent components of the sensor in a second grid-like structure; and wherein the second grid like structure is selected to match the first grid-like structure to enable the sensor to be coupled to said substrate to provide said cover glass, and said cover glass to be installed on said display screen so that light output from said active regions of said display array passes through the sensor; and further comprising one or more reference features arranged to enable a selected alignment to be provided between the sensor and a said display screen of said UE device, wherein the sensor array of sensor pixels of the biometric skin contact sensor is arranged at a selected offset from said one or more reference features, wherein a tolerance for the selected offset of the sensor array from the one or more reference features is less than a pixel pitch for the sensor pixels of the sensor array.

* * * * *